(12) United States Patent
Suzuki et al.

(10) Patent No.: US 7,225,111 B2
(45) Date of Patent: May 29, 2007

(54) MONITORING APPARATUS

(75) Inventors: Kaoru Suzuki, Yokohama (JP);
Takashi Yoshimi, Fujisawa (JP);
Daisuke Yamamoto, Yokohama (JP);
Nobuto Matsuhira, Yokohama (JP);
Nobutaka Kikuiri, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/110,850

(22) Filed: Apr. 21, 2005

(65) Prior Publication Data

US 2005/0192778 A1 Sep. 1, 2005

Related U.S. Application Data

(62) Division of application No. 10/400,383, filed on Mar. 28, 2003, now Pat. No. 6,907,388.

(30) Foreign Application Priority Data

Mar. 29, 2002 (JP) .............................. 2002-097911

(51) Int. Cl.
*G06F 11/00* (2006.01)
(52) U.S. Cl. .................................. 702/188; 340/545.1
(58) Field of Classification Search ................ 702/122, 702/123, 177, 178, 185, 187, 188; 340/506, 340/511, 521, 531, 540, 541, 573.1, 545.1; 348/143, 152, 154
See application file for complete search history.

(56) References Cited

U.S. PATENT DOCUMENTS

| 5,546,071 | A | * | 8/1996 | Zdunich | 340/541 |
|---|---|---|---|---|---|
| 5,581,297 | A | * | 12/1996 | Koz et al. | 348/152 |
| 6,060,994 | A | | 5/2000 | Chen | 340/521 |
| 6,069,655 | A | * | 5/2000 | Seeley et al. | 348/154 |
| 6,107,918 | A | | 8/2000 | Klein et al. | 340/511 |
| 6,400,265 | B1 | | 6/2002 | Saylor et al. | 340/531 |
| 6,441,734 | B1 | * | 8/2002 | Gutta et al. | 340/541 |
| 6,614,884 | B2 | | 9/2003 | Jang | 379/41 |
| 6,693,530 | B1 | | 2/2004 | Dowens et al. | 340/506 |
| 6,762,686 | B1 | | 7/2004 | Tabe | 340/573.1 |
| 2002/0005781 | A1 | * | 1/2002 | Britton | 340/540 |
| 2003/0062997 | A1 | * | 4/2003 | Naidoo et al. | 340/531 |
| 2003/0164877 | A1 | * | 9/2003 | Murai | 348/143 |

FOREIGN PATENT DOCUMENTS

JP    5-159187    6/1993

(Continued)

*Primary Examiner*—Marc S. Hoff
*Assistant Examiner*—Mohamed Charioui
(74) *Attorney, Agent, or Firm*—Oblon, Spivak, McClelland, Maier & Neustadt, P.C.

(57) ABSTRACT

In a monitoring apparatus, a target-object to be monitored is observed by an observing unit and a countermeasure is applied depending on an observed situation. The knowledge and information on the general feature relating to the target-object, the observing method and the countermeasure method are prepared in the storing unit of the monitoring apparatus. The individual knowledge and information relating to the target-object are registered by the user in the storing unit by utilizing the general monitor-knowledge. In the monitor-plan executing unit, the observing method and the countermeasure method of the target-object are planned in accordance with the situation by utilizing the general monitor-knowledge and the individual monitor-knowledge, and the plan is executed.

26 Claims, 16 Drawing Sheets

| (A) Target object | (B) Expected damage | (C) Monitoring to be performed | (D) Evidence to be inspected | (E) Required preparation and countermeasure |
|---|---|---|---|---|
| Window | Intrusion | Monitoring for crime prevention | Glass breakage | Breakage detecting sensor |
| | Fire | Monitoring for fire prevention | Unlocking | Unlocking detecting sensor |
| | Gas leakage | | Opening-closing of window | Opening-closing detecting sensor |
| | Disease | Monitoring for preventing injury and sickness | Intruder | Heat source detecting sensor |
| | Injury | | · | Robot positioning |
| | | | | Reporting and alarming |

FOREIGN PATENT DOCUMENTS

| | | |
|---|---|---|
| JP | 5-300950 | 11/1993 |
| JP | 7-286870 | 10/1995 |
| JP | 8-241123 | 9/1996 |
| JP | 11-14121 | 1/1999 |
| JP | 2002-57869 | 2/2002 |

* cited by examiner

MONITORING APPARATUS

CROSS-REFERENCE TO RELATED APPLICATIONS

This application is a division of and claims the benefit of priority under 35 USC §120 from U.S. Ser. No. 10/400,383, filed Mar. 28, 2003 now U.S. Pat. No. 6,907,388, and is based upon and claims the benefit of priority under 35 USC §119 from Japanese Patent Application No. 2002-097911, filed Mar. 29, 2002, the entire contents of which are incorporated herein by reference.

BACKGROUND OF THE INVENTION

1. Field of the Invention

The present invention relates to a monitoring apparatus for monitoring objects to detect abnormality of the object to be monitored and countermeasure the abnormality of the object, particularly, to a monitoring apparatus capable of being widely used for various purposes, in which an appropriate guard method including observing and countermeasure methods is automatically set by the minimum input required for facilitating the introduction of the monitoring apparatus into a general household.

2. Description of the Related Art

In general, a monitoring apparatus is equipped with a sensor for measuring a physical amount to generate an electrical signal. The monitoring apparatus analyzes the electrical signal generated from the sensor to monitor the state of the target-object to be monitored and discriminates the state of the target-object between at least two classes, i.e., between the normal state and the abnormal state. Also, where the state of the target-object is discriminated as an abnormal state, an output signal relating to the abnormality such as a report or an alarm is generated. More positively, some measures for removing the cause of the abnormality are taken.

The monitoring apparatus of this type includes a monitoring apparatus utilizing a movable guarding robot that can move with sensors mounted thereon. The monitoring apparatus utilizing a robot is advantageous in that the monitoring can be achieved by simply disposing the robot within a facility, in that a wide area can be guarded because the sensors itself is moved, and in that a high degree of automatic guarding can be achieved by mounting a small number of high function sensors. The monitoring apparatus of this type is not limited to the utilizing of a movable guarding robot alone and is capable of performing guarding more effectively by allowing the movable guarding robot to cooperate with a cheap fixed sensor.

The particular movable guarding robot was proposed first as one of guard systems directed to a large facility such as a building. The particular proposal includes, for example, "Guard Method Using Movable Guarding robot" disclosed in Jpn. Pat. Appln. KOKAI Publication No. 5-159187. It is proposed in this prior art that, where the movable guarding robot automatically detects an abnormality, a calibration method is employed in which the guarding robot preliminarily makes a tour during the normal time and calculates the threshold value of the abnormal detection from the sensor output (normal value) in each location on the tour route so as to discriminate without fail between the normal state and the abnormal state.

The guard method disclosed in Jpn. Pat. Appln. KOKAI Publication No. 5-159187 referred to above does not require an exclusive guardian so as to lower the operating cost and, thus, the monitoring apparatus can be introduced easily into the general household. To be more specific, the monitoring apparatus permits decreasing the economic burden required for the introduction of the monitoring apparatus so as to make it possible to pave the way to the introduction of the monitoring apparatus into the general household. Particularly, compared with the monitoring apparatus using a large number of fixed guard cameras, the monitoring apparatus utilizing the movable guarding robot is unlikely to produce the feeling of being kept watched and, thus, produces the effect of alleviating the psychological resistance felt by the general user. Also, the monitoring apparatus in which the state of the target-object to be monitored is reported to the user in place of an external guardian matches the feeling of the general user that he does not wish to have the situation within the household overlooked.

An additional problem to be considered and resolved in introducing the monitoring apparatus into a general household is the ease of the initial setting. In general, an exclusive setting staff initially sets the monitoring apparatus. To be more specific, in the guard method using fixed sensors, prescribed sensors are arranged in prescribed locations such as a door and a window through which an intruder intrudes into the household and a kitchen from which a fire is possibly brought about. These sensors are connected to a central apparatus arranged in each household and are further connected from the central apparatus to a remote guard center by using a public network. In a monitoring apparatus of this type, all the operations as to where which sensor is arranged and which sensor is connected to which terminal of the central apparatus are determined and performed by the exclusive staff.

In the guard method utilizing a robot, it is necessary to set in the monitoring apparatus the information including the site to be monitored within the facility and, where a plurality of sites are to be monitored, the route through which the robot makes a tour for monitoring the plural sites and the matter to which attentions must be paid by the touring robot in each guard site.

In general, the guard method, i.e., what and how the monitoring apparatus observes, is determined by the five procedures given below:

(A) Setting of the target-object to be monitored
(B) Expected damage
(C) Guard to be performed
(D) Evidence to be detected
(E) Required preparations and countermeasure The process of determining the guard method will now be described with reference to FIG. 1.

Where the target-object (A) to be monitored is, for example, a window, the human being knows as a common sense that a thief is capable of intruding (B) into the household through the window, though it is substantially impossible for a fire to take place from the window and it is impossible for the window to be injured or to suffer from a disease because the window is not a living creature, as shown in FIG. 1. Therefore, where the guard (C) to be performed includes options of guarding for crime prevention, guarding for the disaster prevention, and guarding for the surveillance, it suffices to perform guarding with crime prevention kept in mind in respect of the window. In this case, it suffices to examine breakage of the glass, unlocking by the key, opening or closing of the window, and presence or absence of an intruder in respect of the evidence (D) to be detected. If exclusive sensors for detecting the breakage of the glass, etc., noted above are mounted on the window, it suffices to monitor the outputs of the exclusive sensors in respect of the required preparations and countermeasures (E). Also, in order to look into the breakage of the glass, etc., by using, for example, a monitor camera, it is apparent that it suffices to mount the monitor camera such that the camera faces the window and is positioned to facilitate the image analysis of, for example, the glass and the lock and to set, for example, the zoom value. It should be noted, however, that some of the required preparations and countermeasures (E) can be determined appropriately by only experts.

In the conventional monitoring apparatus, users input the various setting on the monitoring apparatus as described in the procedures of (A) to (E) shown in FIG. 1. For example, in respect of the position setting of the movable guarding robot, any of the methods given below is employed for teaching the position and posture that are to be taken by the robot. One of the methods is a method of inputting the touring route of the robot on a map of the facility displayed on a control terminal, and the other method is a method of actually operating the robot to store in the robot the route through which the robot was actually moved (teaching play back). It is also possible to impart similarly to the robot the posture of the camera and the setting of the optical system such as the focus, iris and zoom. In any case, the position and posture of the robot or the posture of the mounted camera and the setting of the optical value are imparted directly as values. Also, as disclosed in Jpn. Pat. Appln. KOKAI Publication No. 5-159187 referred to previously, the threshold value for the sensor to discriminate abnormality is imparted directly to the guarding robot even in the case where the robot is allowed to learn actually the output of the sensor during the normal state.

Regardless of the situation that the human being (operator) knows what the target-object to be monitored is, the required and detailed values obtained as a result of item (E) given in FIG. 1 are imparted to the monitoring apparatus in place of the information as to what the target-object is. This is because the conventional monitoring apparatus is capable of knowing the target-object only as a series of values determined as a result of item (E) referred to above, and because a sufficient knowledge and system for allowing the monitoring apparatus to determine by itself the procedure of items (A) to (E) are not imparted at all to the monitoring apparatus. Therefore, the conventional monitoring apparatus is configured on the premise that the setting of the values is performed by expert staff, or the monitoring apparatus does not perform at all the particular operation and is capable of performing simple operations alone. Such being the situation, serious problems remain unsolved in the conventional monitoring apparatus as pointed out below.

Specifically, the operation to determine where and how the guarding is done by using a certain monitoring apparatus under differing conditions falls within the domain of the security expert, which is determined in accordance with the monitoring apparatus and the sensor used. Of course, it is difficult for the general domestic user, who is a nonprofessional, to impart by himself the particular information to the monitoring apparatus. In other words, it is difficult for the general user to set up by himself the monitoring apparatus bought from a store so as to operate the monitoring apparatus in a manner to receive a high degree of guarding.

It should be noted that the monitoring apparatus does not have a knowledge and a system for expecting the damage that is to be done to the target-object to be monitored, for detecting the evidence required for preventing the damage, for determining how to deal with the difficulty, and for calculating the value required for overcoming the difficulty. Under the circumstances, it is necessary for the laborious detailed setting operation to be performed by the human being in order to perform guarding.

Where the target-object to be monitored is a window as exemplified above, there is a guard method adapted for the window. Where the target-object is a small kitchen range, there is another guard method adapted for the small kitchen range. Further, where the target-object is a baby, there is still another guard method adapted for the baby. In this fashion, the various target-objects to be monitored can be classified into the "window class", the "small kitchen range class", and the "baby class" in accordance with the pattern of the guard method adapted for each of the various target-objects.

If the knowledge on, for example, the "window class" and the system for utilizing the knowledge are imparted to the monitoring apparatus for allowing the monitoring apparatus to perform by itself the procedure of items (A) to (E) given in FIG. 1, it is possible to allow the monitoring apparatus to plan a high degree of guarding for the "window" and to execute the plan by simply teaching to the monitoring apparatus that the window of a kitchen that is to be monitored is the "window class" known by the monitoring apparatus while eliminating the necessity of determining and inputting the troublesome final values.

BRIEF SUMMARY OF THE INVENTION

An object of the present invention is to provide a monitoring apparatus that can be used widely, in which, if the user designates the target-object to be monitored, it is possible for the monitoring apparatus itself to automatically determine a suitable guard method adapted for monitoring the target-object based on the designation.

According to an aspect of the present invention, there is provided a monitoring apparatus for monitoring an abnormality of each of target-objects and executing a countermeasure in accordance with a abnormal situation of the target-object, comprising:

first storing unit configured to store general monitor knowledge and information on a general feature of the target-objects, a general observing method of the target-objects and a general executing method relating to the target-objects;

input unit configured to input individual monitor knowledge and information on the respective target-objects with utilizing the general monitor knowledge and information;

second storing unit configured to store the individual monitor knowledge and information;

planning unit configured to plan observing and countermeasure programs relating to the abnormal situation of the target-object based on the general and individual monitor-knowledge and information;

observing unit configured to observe the target-object in accordance with a observing program to generate a situation information; and executing unit configured to execute a countermeasure program in accordance with the situation information from the observing unit.

According to an another aspect of the present invention, there is provided a method of monitoring an abnormality of each of target-objects and executing a countermeasure in accordance with a abnormal situation of the target-object, comprising:

storing general monitor knowledge and information on a general feature of the target-objects, a general observing method of the target-objects and a general executing method relating to the target-objects;

inputting individual monitor knowledge and information on the respective target-objects with utilizing the general monitor knowledge and information;

storing store the individual monitor knowledge and information;

planning observing and countermeasure programs relating to the abnormal situation of the target-object based on the general and individual monitor-knowledge and information;

observing the target-object in accordance with a observing program to generate a situation information; and executing a countermeasure program in accordance with the situation information from the observing the target-object.

DETAILED DESCRIPTION OF THE INVENTION

The monitoring apparatus according to one embodiment of the present invention will now be described with reference to the accompanying drawings.

(Functional Block Configuration)

Figure 1:
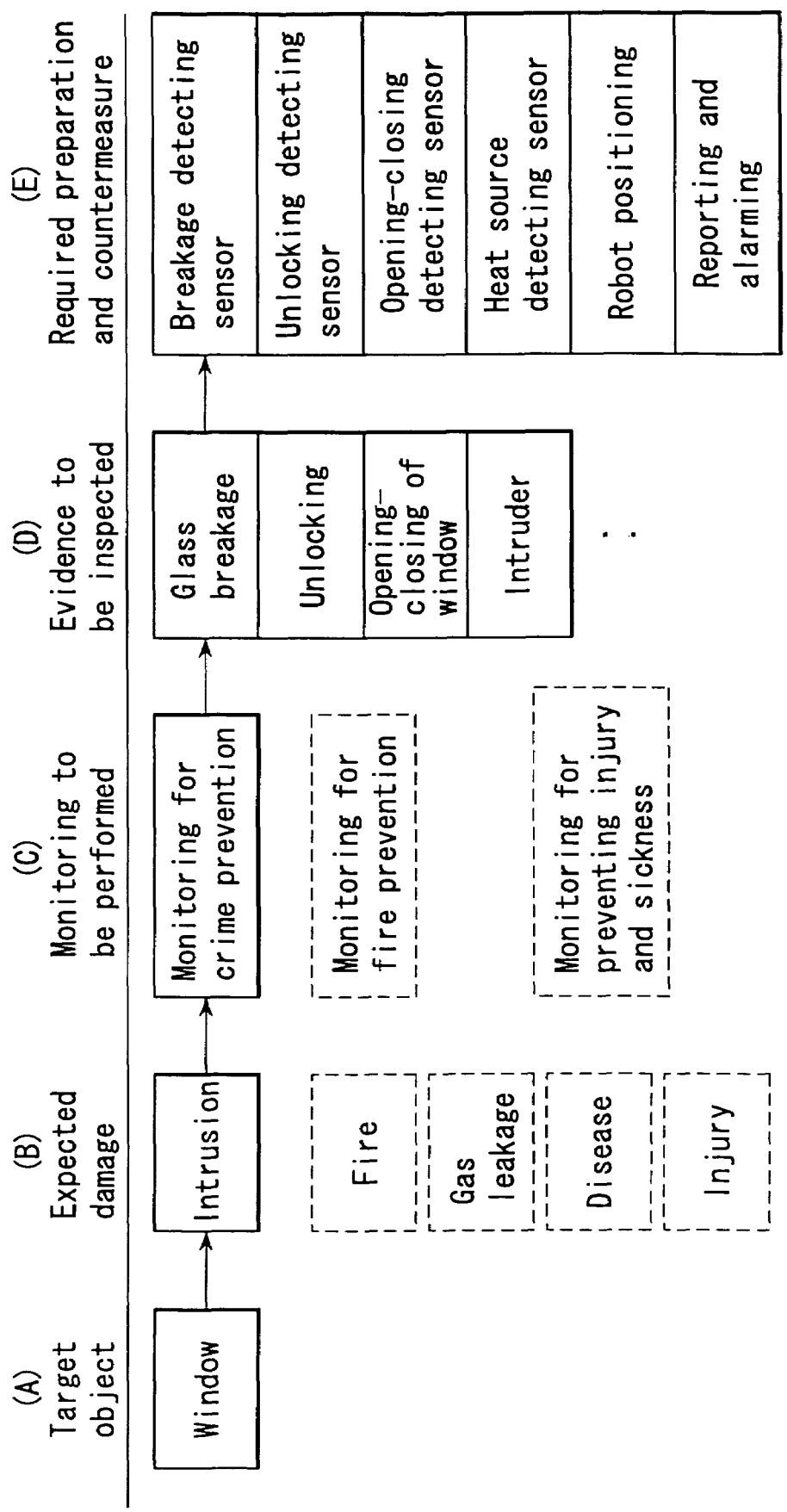
FIG. 1 is a block diagram showing the general process of determining the guard method in respect of a target-object to be monitored.
Figure 2:
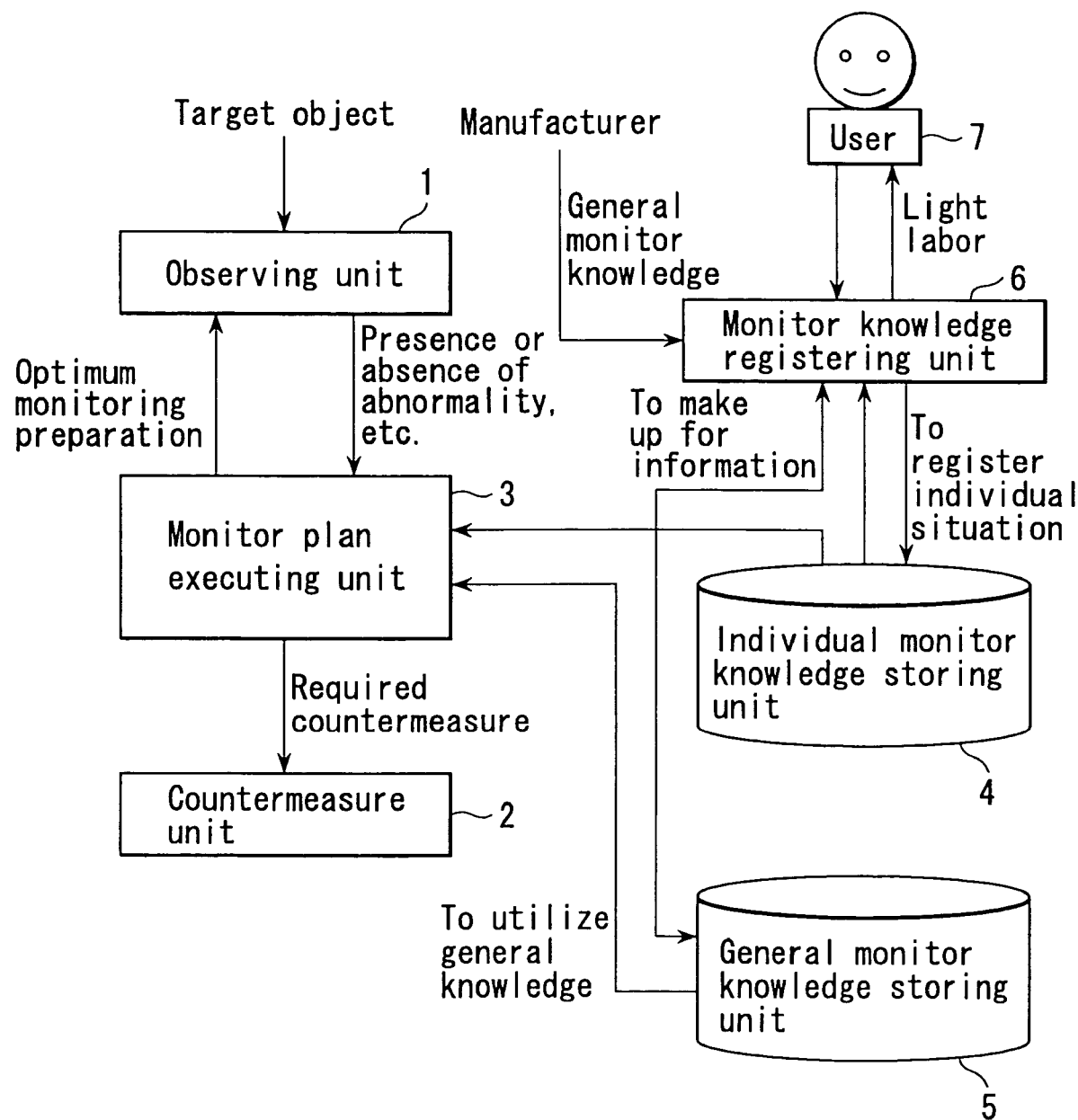
FIG. 2 is a functional block diagram showing the functions performed by a monitoring apparatus according to one embodiment of the present invention.

FIG. 2 shows the configuration of the functional block according to one embodiment of the monitoring apparatus of the present invention. As shown in the drawing, the monitoring apparatus shown in FIG. 2 comprises an observing unit 1, a countermeasure unit 2, a monitor-plan executing unit 3, an individual monitor-knowledge storing unit 4, a general monitor-knowledge storing unit 5 and a monitor-knowledge registering unit 6.

The observing unit 1 comprises observing equipment capable of monitoring the target-object to be monitored and serves to produce and output information representing the presence or absence of an abnormality and the kind of the abnormality and other required information. To be more specific, the output signals are output from the sensors which are mounted on a movable guarding robot and arranged in an environment of, for example, a house in accordance with the instruction given from the monitor-plan executing unit 3 referred to herein later. The output signal are recognized and interpreted in the observing unit 1 so as to generate the information representing the presence or absence of an abnormality and the other required information and to output the information thus generated as observing information. In this case, the observing unit 1 controls a robot for realizing the required guard conditions including, for example, the position and posture of the robot, the posture and setting of a monitoring camera, the sensitivities of various sensors, and the setting of the threshold value for discriminating an abnormality so as to control various sensors.

The executing unit 2 executes prescribed countermeasures that are planned on the basis of the observing information given from the observing unit 1. In the executing unit 2, prescribed countermeasures conforming with the situation such as the report and record on an abnormality, the repulse of a criminal, the fire extinction and the ventilation are executed by fully utilizing the active devices mounted to a movable guarding robot or arranged in an environment such as a house or by fully utilizing the functions imparted to the executing unit 2 itself.

The observing method of a target-object to be monitored and the countermeasures are planned in the monitor-plan executing unit 3, and the plan thus formed is imparted from the monitor-plan executing unit 3 to the observing unit 1 and the executing unit 2. The monitor-plan executing unit 3 selects the target-object to be monitored presently, determines the optimum guard condition in respect of the target-object to be monitored, gives an instruction to the observing unit 1 to realize the optimum guard condition thus determined, and is shifted to a monitoring condition while adjusting the instruction based on the information given from the observing unit 1. After the monitoring condition has been realized, the monitor-plan executing unit 3 inspects an abnormality of the target-object by using the observing unit 1, and, when an abnormality has been detected, determines the optimum countermeasure. Further, the monitor-plan executing unit 3 gives an instruction to the executing unit 2 to execute the optimum countermeasure thus determined and evaluates the effect produced by the countermeasure through the observing unit 1. Where the abnormality has been resolved and where an abnormality has not been detected, the next target-object to be monitored is determined and the guard is continued.

The individual monitor-knowledge storing unit 4 stores the individual knowledge and information on the target-object to be monitored. To be more specific, stored in the individual monitor-knowledge storing unit 4 is the individual monitor-knowledge including the information representing the class of the target-object to be monitored (code for the kind of target-object) and, as required, the information for individually distinguishing the target-object (name) as well as the information representing the site of the target-object in respect of the target-objects within the facility into which the monitoring apparatus is introduced. Also stored in the individual monitor-knowledge storing unit 4 is the information representing the class of the target-object, the information for individually distinguishing the target-object, and the information denoting the site of the target-object in addition to the individual monitor-knowledge referred to above.

Stored in the general monitor-knowledge storing unit 5 is the knowledge and information on, for example, the general features, the observing method and the countermeasures on the target-object to be monitored. To be more specific, stored in the general monitor-knowledge storing unit 5 are the guard condition procedure for determining the optimum guard condition and for realizing the guard condition, an abnormality detection procedure for effectively detecting an abnormality of the target-object, and a countermeasure procedure for determining and executing the countermeasure when an abnormality has taken place in respect of each class of the target-objects to be monitored. To be more specific, these procedures are not the procedures inherent in the specific target-object but the general monitor-knowledge prepared for each of the known classes of the target-objects. The monitor-plan executing unit 3 executes each of the procedures conforming with the classes of the target-objects described in the individual monitor-knowledge so as to plan and execute the guard method adapted for the class of the target-object.

The monitor-knowledge registering unit 6 is equipped with an interface for registering the individual knowledge and information on the target-object in the individual monitor-knowledge storing unit 4, i.e., a conversation unit for making a conversation with a user 7. It is possible for the user 7 to input the individual monitor-knowledge via the conversation unit included in the monitor-knowledge registering unit 6 and to house the input individual monitor-knowledge in the individual monitor-knowledge storing unit 4.

Incidentally, it is possible for the monitor-knowledge registering unit 6 to include a unit for inputting the general monitor-knowledge from the outside. For example, it is possible to receive appropriately the general monitor-knowledge from the manufacturers of the monitoring apparatus by, for example, correspondence, to read appropriately the general monitor-knowledge stored in a detachable recording medium, and to store in the general monitor-knowledge storing unit 5 the general monitor-knowledge that is received or read.

(Example of Equipment Configuration)

Figure 3:
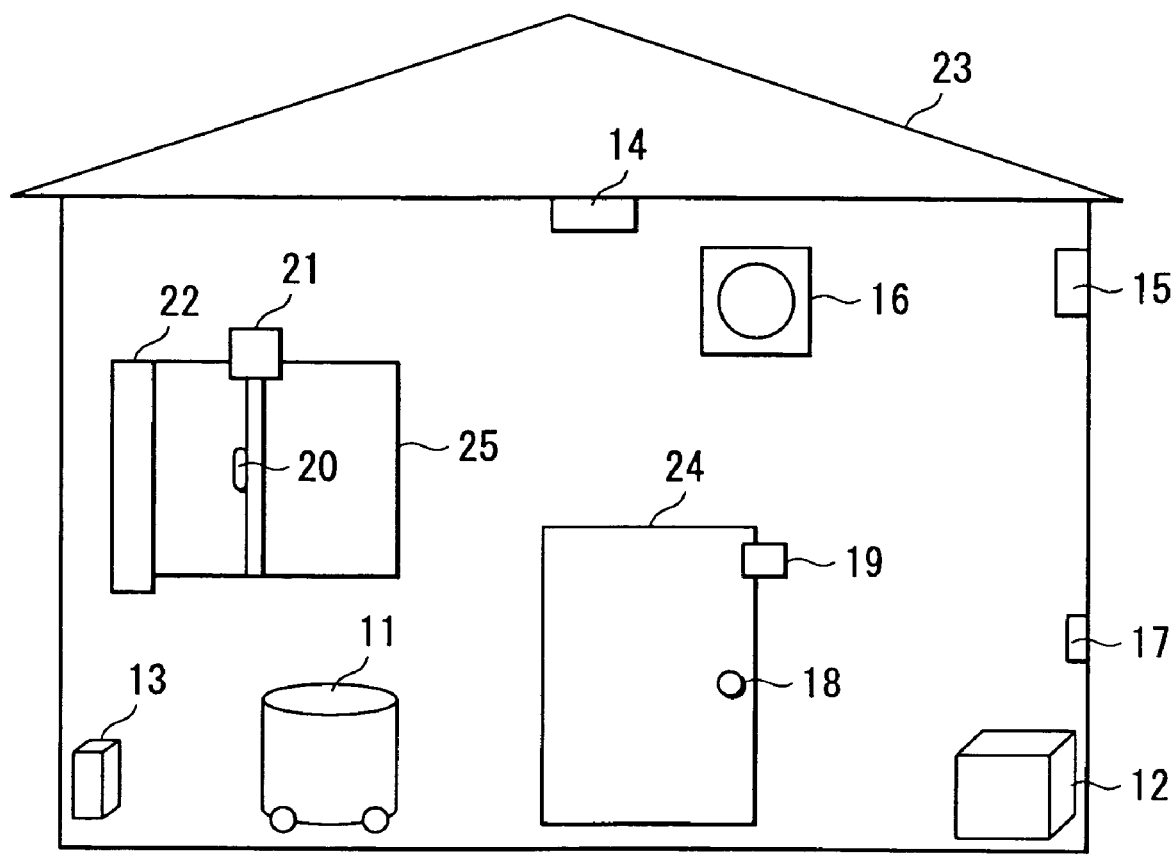
FIG. 3 schematically exemplifies the configuration of the apparatuses used in the monitoring apparatus shown in FIG. 2.

FIG. 3 exemplifies the configuration of the equipment for realizing the monitoring apparatus shown in FIG. 2. The monitoring apparatus shown in FIG. 3 comprises a movable guarding robot 11, a base station unit 12 and a charging unit 12. It is possible to add an external unit interlocked with the movable guarding robot 11, the base station unit 12 or the charging unit 13 by the wireless communication or the wire communication to the monitoring apparatus. The external unit includes, for example, a fire sensor 14 arranged in a house 23, a gas leakage sensor 15, a ventilating fan 16, an electromotive gas cock 17, an electromagnetic lock 18 mounted to a door 24 of the house 23, an opening-closing sensor 19 of the electromagnetic lock 18, an electromagnetic lock 20 mounted to a window 25 of the house 23, an opening-closing sensor 21 of the electromagnetic lock 20, and an electromotive curtain 22.

It is possible for the robot 11 to detect an abnormality of the target-object by using a sensor mounted to the robot 11 itself. Further, the robot 11 is capable of wireless communication with the base station unit 12 and, thus, the information can be exchanged between the robot 11 and the base station unit 12 even if the robot 11 is performing its operation at a site remote from the base station unit 12 mounted under an environment of, for example, a house. For example, the target-object is observed by an image sensor (CCD camera) mounted on the robot 11 and, when an abnormality has been found, the image data is transmitted to the base station unit 12 and the information for coping with the abnormality is also transmitted to the base station unit 12.

The base station unit 12 is capable of communication with the charging unit 13 and the various external units in addition to the robot 11 by means of the wireless communication or the wire communication. The power saving type communicating unit capable of a wireless communication in a short distance or a communicating unit using a power cable is used as the communicating unit.

The base station unit 12 guards the state of communication with the robot 11, the charging unit 13 and the external units and detects an abnormality of the equipment itself based on the situation that the interruption of the communication continues for a prescribed period of time. Also, where, for example, the robot 11 detects an abnormality of the target-object and transmits the abnormality and the external unit housing a sensor detects an abnormality of the target-object and transmits the abnormality, the base station unit 12 detects the occurrence of the abnormality in the target-object from the received signal transmitted in response to the communication reporting the detection of the abnormality.

The observing unit 1, the monitor-plan executing unit 3, the executing unit 2, the individual monitor-knowledge storing unit 4, the general monitor-knowledge storing unit 5 and the monitor-knowledge registering unit 6, which are shown in FIG. 2, are arranged within the robot 11 and within the base station unit 12. For example, the observing unit 1 and the executing unit 2 are arranged within the movable guarding robot 11, and the monitor-plan executing unit 3, the individual monitor-knowledge storing unit 4, the general monitor-knowledge storing unit 5 and the monitor-knowledge registering unit 6 are arranged within the base station unit 12.

Also, it is possible to arrange in the base station unit 12 the executing unit 2 such as an alarm unit for generating an alarming sound described below and the communicating unit for the communication via the public network as additional equipments.

The base station unit 12, which has detected an abnormality of the equipment or an abnormality of the target-object to be monitored, plans and executes some countermeasure behaviors. The countermeasure behaviors planned and executed by the base station unit 12 are classified into three behaviors as given below:

Countermeasure behavior 1: To record and preserve with safety what abnormality has been generated.

Countermeasure behavior 2: To report to the user without fail what abnormality has been generated.

Countermeasure behavior 3: To suppress the damage produced by the abnormality to the minimum level.

For performing the countermeasure behavior 1 given above, the base station unit 12 is equipped with a memory unit of a large capacity for recording the kind of the generated abnormality and the output data of the sensor from the time slightly before generation of the abnormality as a log provided with a time stamp. Incidentally, a part of the log is also recorded and stored in the robot 11 in an overlapping fashion.

For performing the countermeasure behavior 2 given above, the base station unit 12 is equipped with an alarming sound generating unit and a communication unit through a public network so as to report the situation to the neighboring people, to threaten the criminal or to report the situation to, for example, a portable telephone of the user.

Further, for performing the countermeasure behavior 3 given above, the base station unit 12 takes measures to eliminate the abnormal situation and to prevent the expansion of the damage caused by the abnormal situation. In the case of, for example, a gas leakage, it is possible for the base station unit 12 to fasten the electromotive gas cock 17 and to turn the ventilating fan 16. Also, in the case of a fire, it is possible to dispatch the robot 11 rapidly to the origin of the fire for the extinction, if an extinction apparatus is mounted to the robot 11.

The charging unit 13 is docked with the robot 11 so as to charge the battery housed in the robot 11 or to substitute a new battery for the battery housed in robot 11, thereby supplying an electrical power from the charging unit 13 to the robot 11.

(Abnormality Detection in Apparatus)

A unique discriminating code is imparted to each of the apparatuses shown in FIG. 3. When some data or information is transmitted, the data or information is transmitted in the form of a packet in which the discriminating code is added to the packet header of the data or information. As a result, it is possible to confirm whether or not each of the apparatuses communicating with the other apparatus, which is not limited to the base station unit 12, is being operated. That is, the apparatus can transmit some packet periodically to the other apparatuses to confirm that which apparatus is transmitted the data or information. It follows that it is highly possible for the apparatus that has ceased to transmit a packet to be disordered or to be destroyed by someone.

(Variation of Apparatus Configuration)

In the description given above, the monitoring apparatus includes units such as the movable guarding robot 11, the base station unit 12, the charging unit 13 and the external units 14 to 22. Alternatively, it is possible to modify the monitoring apparatus of the present invention in various fashions. For example, it is apparently possible to form the movable guarding robot 11 and the base station unit 12 as an integral apparatus, to form the base station unit 12 and the charging unit 13 as an integral apparatus, to mount only the active apparatus for coping with the abnormality to the movable guarding robot 11, in place of mounting the sensor for detecting an abnormality to the movable guarding robot 11, for allowing the sensor of the external unit to detect an abnormality, or, by contraries, to exclude the external unit from the configuration of the monitoring apparatus.

(Configuration of Information)

The information required for allowing the apparatus according to this embodiment of the present invention to perform the function of a monitor apparatus includes the individual monitor-knowledge having a high individuality that is dependent on the user and the site described below in detail, the general monitor-knowledge provided as a common factor, and the abnormality detecting information relating to the actual abnormality occurrence and the progress of the situation.

Each of the individual monitor-knowledge, the general monitor-knowledge, and the abnormality detecting information will now be described below in detail.

(Individual Monitor-knowledge)

The individual monitor-knowledge is input into the individual monitor-knowledge storing unit 4 via the monitor-knowledge registering unit 6 by a user or by a site assistant assisting the user who does not have a special expert knowledge. The input individual monitor-knowledge is stored in the individual monitor-knowledge storing unit 4.

Figure 4:
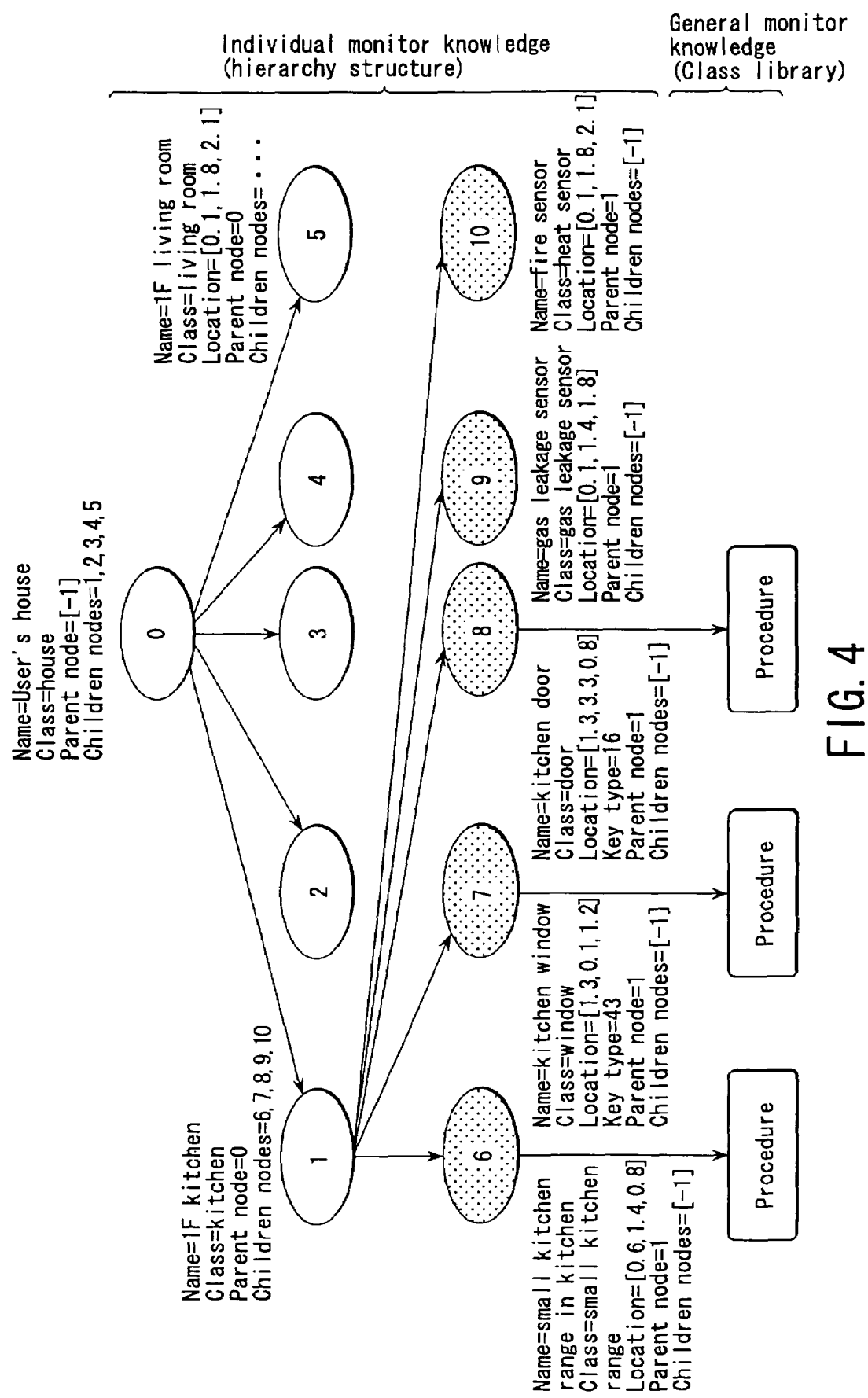
FIG. 4 conceptually shows as an example the relationship between the individual monitor-knowledge and the general monitor-knowledge in the monitoring apparatus shown in FIG. 2 in terms of the hierarchy structure.

The individual monitor-knowledge is the information reflecting the situation inherent in the site into which the monitoring apparatus is introduced, i.e., the information showing the actual target-object to be monitored, which is present in the home of the user, and represents what target-object is present in what part of the site. Also, where a sensor such as a gas leakage sensor, which is capable of interlocking with the monitor apparatus, or an external unit such as an active apparatus, which is capable of interlocking with the monitoring apparatus such as an electromotive lock, is arranged, it is possible to add the information denoting where and how the external unit is arranged to the individual monitor-knowledge. The information on the target-object to be monitored and on the external unit is represented by a hierarchy structure in view of the telescopic relationship. FIG. 4 exemplifies the hierarchy structure.

(Target-object in Individual Monitor-knowledge and Hierarchy Structure of External Unit)

FIG. 4 shows that there is a node No. 1 denoting the home of the user in the uppermost position of the hierarchy structure. The nodes representing the partition of the room arrangement such as node No. 1 denoting the first floor kitchen and node No. 5 denoting the first floor living room are positioned below the node No. 1 referred to above. Further, the nodes denoting the target-objects to be monitored such as a small kitchen range (node No. 6), a window (node No. 7) and a kitchen door (node No. 7) and the nodes denoting the external units such as a gas leakage sensor (node No. 9) and a fire sensor (node No. 10) are positioned below the node denoting the partition of the room arrangement, e.g., below the kitchen denoted by the node No. 1.

Further, the nodes denoting the external units such as a breakage sensor (not shown) and an opening-closing sensor (not shown) are positioned below the node No. 7 denoting the window, and the nodes denoting the external units such as an opening-closing sensor (not shown) and an electromagnetic lock (not shown) are positioned below the node No. 8 denoting the kitchen door. Also, each of the window node No. 7 and the kitchen door node No. 8 includes a node (not shown) denoting the key and another node (not shown)

denoting the window glass as lower target-objects to be monitored. In this case, the electromagnetic lock node below the kitchen door node constitutes an external unit and, at the same, constitutes the target-object to be monitored.

The nodes other than the target-object nodes in the lowermost positions of the branches of the hierarchy structure, e.g., the node denoting the home of the user in the uppermost position and the nodes denoting the kitchen and the living room in the intermediate positions, also constitute target-objects to be monitored in a broad sense. In this case, the monitoring of the kitchen can be achieved by monitoring all the target-objects in the lower positions including the small kitchen range, the window and the kitchen door. Of course, the monitoring is achieved under the condition that a required procedure is allowed to correspond to the target-object node in the lowermost position of each of the branches of the hierarchy structure. Consecutive numbers are imparted to the nodes. The consecutive number denotes in what arranging factor the node is stored in the case where the nodes are stored in a manner to form an arrangement. Also, a name such as "1F kitchen" is imparted to each node so as to facilitate the reading of the node when the user has registered the node in the individual monitor-knowledge. Further, the information denoting the class such as "kitchen" is imparted to the node denoting the target-object to be monitored and the external unit. If the class is clarified, it is possible for the monitoring apparatus to monitor satisfactorily the target-object to be monitored, which is denoted by the node, and it is possible to utilize the external unit denoted by the node.

The numbers denoting the parent node and the children nodes are imparted to all the nodes. The parent node represents the node positioned immediately above the node in question, and the children nodes represent the nodes positioned immediately below the node in question. The numbers denoting the parent node and the children nodes designate the factor numbers of the node arrangement referred to above and provide the information defining the stratum relationship of the nodes stored in the one-dimensional arrangement that does not have a stratum. Incidentally, "−1" is put to the node that does not have a parent node and a child node.

Each of the nodes denoting the target-objects to be monitored and the external units, which are in the lowermost positions, has information indicating auxiliary parameters such as the key type and the location shown in the drawing in addition to the name and the class noted above. Also, information indicating the room arrangement (not shown) is imparted as required to the node corresponding to the house, the room and the passageway. Further, the individual monitor-knowledge includes information for identifying the proper user separately from the hierarchy structure.

(General Monitor-knowledge)

The general monitor-knowledge is the monitor-knowledge common with the apparatus prepared in advance by the system supervisor of the monitoring apparatus and is stored in the general monitor-knowledge storing unit 5.

The general monitor-knowledge includes a procedure library for realizing the optimum monitoring method conforming with the class of the target-object as the information common with various sites and is stored in the general monitor-knowledge storing unit 5. The general monitor-knowledge corresponds to the knowledge common with the classes in respect of the target-objects to be monitored and the external units set by the individual monitor-knowledge referred to above, i.e., corresponds to the information on the monitor preparation procedure for determining, for example, the distance and the zoom value adapted for the monitoring, on the abnormality detection procedure adapted for detection of the abnormality of each of the target-objects to be monitored, and on the countermeasure action procedure for executing the measures for suppressing the disaster expected at the time of the abnormality and the damage caused by the crime to the minimum level. Incidentally, the following two measures (table look up method and object-directed programming) are considered to provide the methods for determining the monitoring method adapted for the target-object defined by the individual monitor-knowledge.

(Table Look Up Method)

One of the methods for determining the monitoring method noted above is the table look up method in which the information on the suitable monitor preparation procedure, the abnormality detection procedure and the countermeasure action procedure is referred to by the table indexing with reference to the information on the class of the target-object to be monitored. In this case, the table is prepared as the general monitor-knowledge. Each procedure is mounted as a program sub-routine, and the function library itself of each procedure is also supplied to the monitoring apparatus as a part of the constituents of the general monitor-knowledge. The entry address of the function or the name specifying the function is described in the table, and it is possible to call a prescribed function routine by using the particular information.

(Object-directed Programming)

The object-directed programming is the other method for determining the monitoring method referred to above. One object is determined in accordance with the class of the target-object to be monitored. Each object includes the exclusive monitor preparation procedure, the abnormality detection procedure and the countermeasure action procedure as the method (program sub-routine), and each object constitutes the general monitor-knowledge as an object library. The specific procedures for the monitor preparation, the abnormality detection and the countermeasure action are imparted to every target-object to be monitored as the method of the object corresponding to the class of the target-object to be monitored.

(Abnormality Detecting Information)

The abnormality detecting information collectively designates the information formed and utilized during operation of the monitoring apparatus including the output data of the various sensors mounted in the observing unit 1, information on the presence or absence of an abnormality detected by analyzing the output data referred to above and on the kind of abnormality, the time at which the abnormality was generated, and the time after generation of the abnormality.

The output in the past of the observing unit 1 and the situation relating to the incident at that time are stored in the monitor-plan executing unit 3 as the abnormality detecting information. When the monitor-plan executing unit 3 judges the presence or absence of the abnormality of the target-object to be monitored based on the output of the observing unit 1, the accuracy of the judgment is improved by referring to the output in the past of the observing unit 1 and to the situation relating to the incident at that time so as to reduce erroneous judgment.

(Details of Individual Monitor-knowledge, General Monitor-knowledge and Abnormality Detecting Information)

Figure 5:
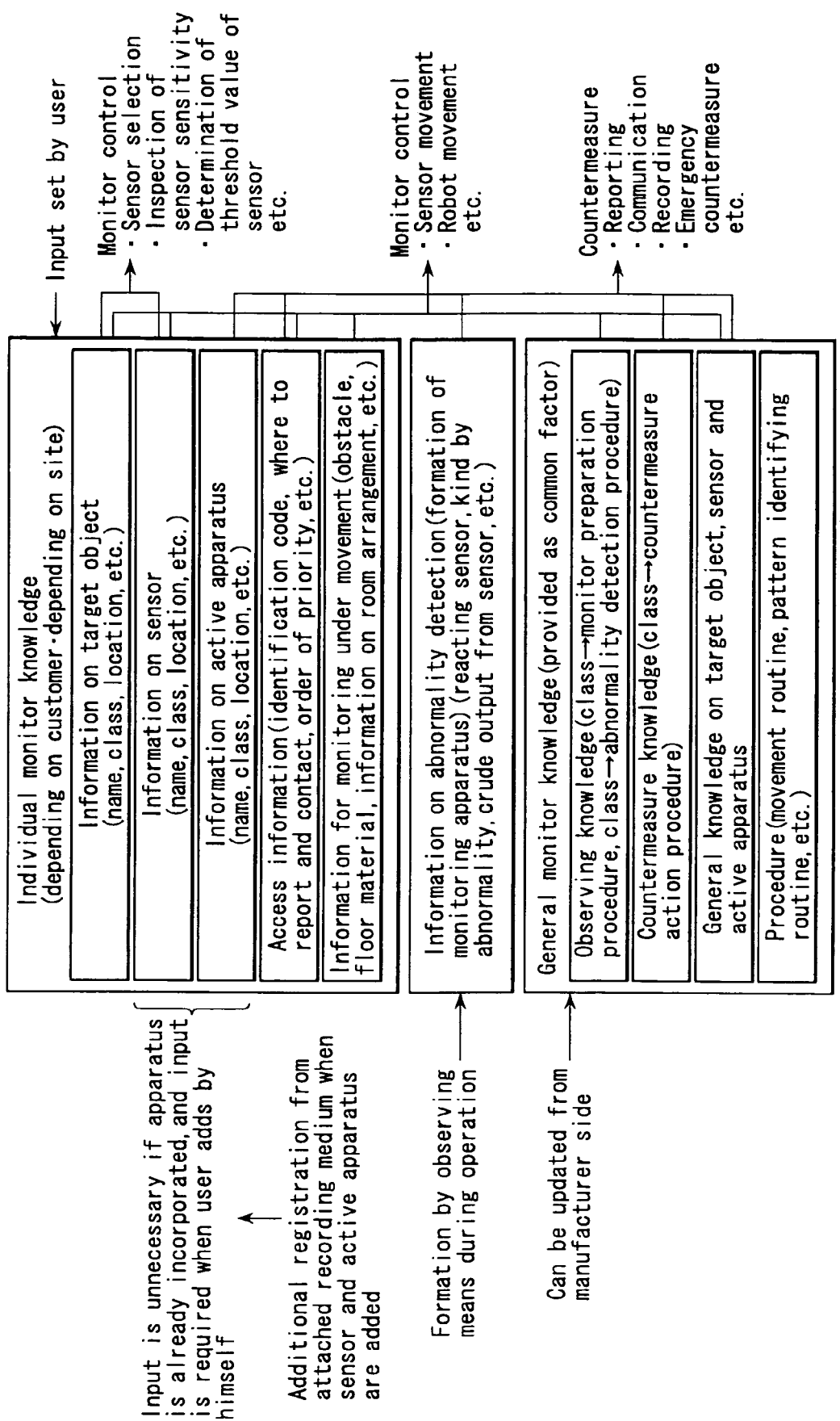
FIG. 5 shows the details of the individual monitor-knowledge, the general monitor-knowledge and the abnormality detecting information in the monitoring apparatus shown in FIG. 2.

FIG. 5 shows a detail of the information described above.

The information stored as individual monitor-knowledge includes information on the name, class and location of the target-object to be monitored, the sensor and the active apparatus (target-object information, sensor information and active apparatus information), the information on the identifying code for the report to the proper user and on the order of priority in the case where there are a plurality of telephone numbers and addresses in respect of the destination of the report (access information), and the information on the room arrangement, the floor material and the obstacles for permitting an appropriate movement in performing the movable monitoring (movable monitor information).

On the other hand, the information stored as the general monitor-knowledge includes the observation knowledge referring to the relationships between the class and the monitor preparation procedure and between the class and the abnormality detection procedure, the countermeasure knowledge referring to the relationship between the class and the countermeasure action procedure, the general knowledge on the target-object to be monitored, the sensor and the active apparatus, and the program sub-routine group having various procedures mounted thereon.

The individual monitor-knowledge is formed by the input from the user. Where a new sensor, a new active apparatus, etc. are added, it is possible to achieve the input easily by using the installer program housed in the recording medium attached to the new sensor, etc. The installer program is used for adding the individual monitor-knowledge and the general monitor-knowledge relating to the classes of the sensor and the active apparatus that are newly added.

Incidentally, it is possible to prepare in advance the information such as a table that permits deriving a prescribed calculated value, the result of the information processing and the control parameter as the general monitor-knowledge in place of the procedure for carrying out a prescribed processing (calculation, information processing and control).

(Process Configuration)

The monitoring apparatus has at least three operation modes (initial setting mode, self-control defense mode and remote control mode).

The initial setting mode is the mode for registering and inputting the individual monitor-knowledge in conformity with the site and for renewing the general monitor-knowledge via, for example, a communication circuit and the recording medium, and constitutes the operation mode that must be executed at first after introduction of the monitoring apparatus.

The self-control defense mode is the mode in which the monitoring apparatus performs its monitoring operation in a self-controlled fashion. In the self-control defense mode, a crime preventing option for protecting the property from, for example, a thief, a fire preventing option for dealing with a fire, and a watching option for ensuring the safety of, for example, a diseased person, an aged person and an infant, are carried out singly or in combination.

The remote control mode is the mode in which the user operates, particularly, the movable guarding robot and the electromotive camera pan head mounted to the monitoring apparatus so as to monitor the site through the sensor of the monitoring apparatus or to move the monitoring apparatus to a prescribed site. It is possible to execute the remote control mode from within the self-control defense mode as described herein later.

Figure 6:
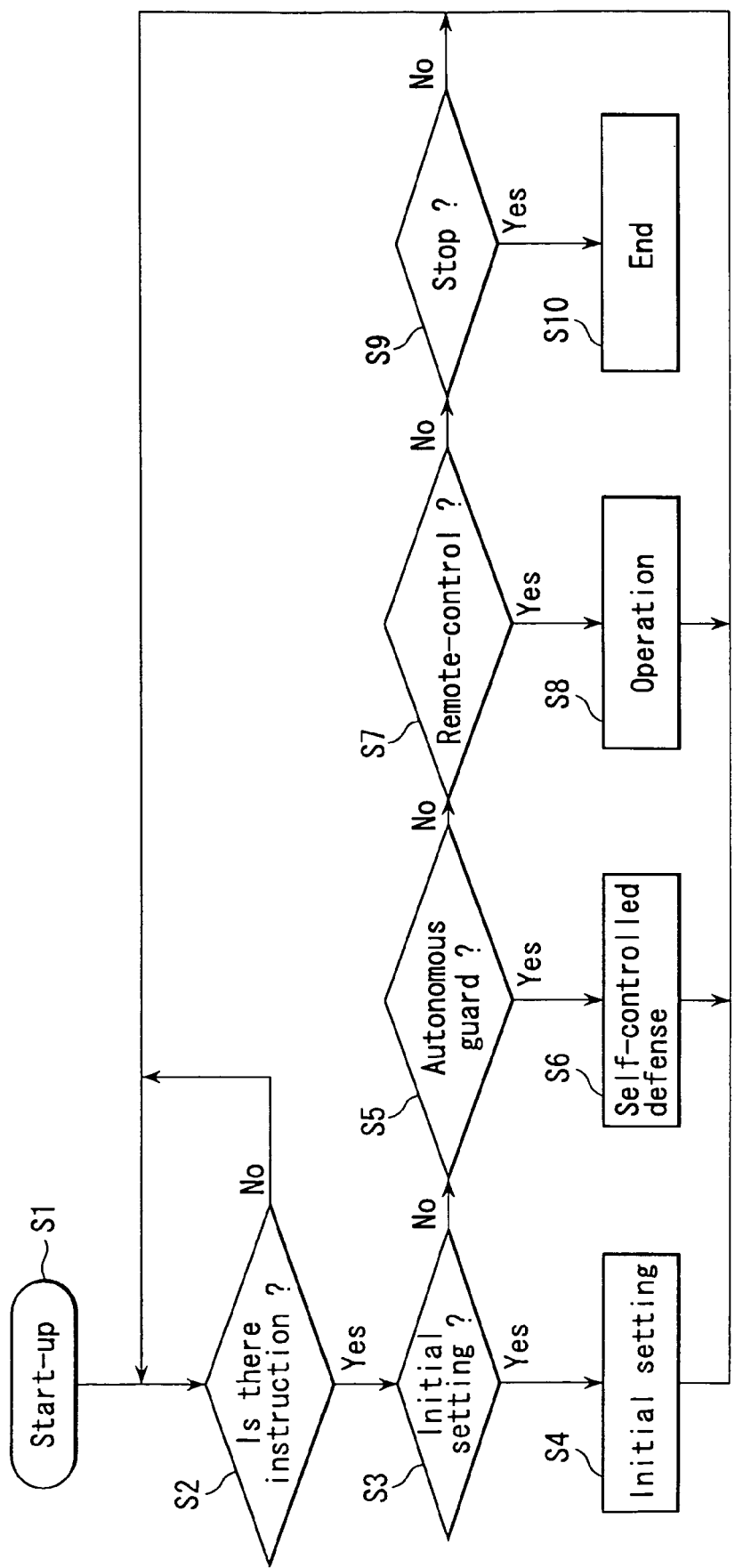
FIG. 6 is a flowchart schematically showing the processing performed by the monitoring apparatus shown in FIG. 2.

The initial setting mode, the self-control defense mode and the remote control mode are executed by the procedures shown in FIG. 6. To be more specific, the operation of the monitoring apparatus is started up upon power supply to the monitoring apparatus (step S1), as shown in FIG. 6. Then, if some instruction is given by the user to the monitoring apparatus through, for example, an operation input unit (switch, button, etc.), a voice instruction receiving unit (voice identifying apparatus or the like) and the communicating unit (a remote controller, a portable telephone, etc.) mounted to the monitoring apparatus (downward branch of step S2), the operation is shifted to the mode conforming with the instruction.

When the instruction designates the initial setting (downward branch of step S3), the monitoring apparatus is shifted to the initial setting mode (step S4), with the result that the individual monitor-knowledge is input in a conversational manner, or the general monitor-knowledge is renewed. When the instruction designates the self-control defense in place of the initial setting (downward branch of step S5), the monitoring apparatus is shifted to the self-control defense mode (step S6) so as to start the monitoring operation. When the instruction designates the remote control in place of the self-control defense (downward branch of step S7), the monitoring apparatus is shifted to the remote control mode (step S8) so as to receive the operation from the user and to start its operation. Further, when the instruction designates the stop of the operation in place of the remote control (step S9), the monitoring apparatus stops its operation and shuts off the power supply (step S10).

When the instruction does not designate any of the items referred to above and, thus, is improper (rightward branch in step S9), the input of the next instruction is waited for (step S2).

When the instruction does not designate any of the items referred to above and, thus, is improper (rightward branch in step S10), the input of the next instruction is waited for (step S2).

(Registration)

The following description covers an example in which the user inputs the information on the target-object to be monitored in the individual monitor-knowledge storing unit 4 and registers the input information by using the monitor-knowledge registering unit 6 in the initial setting mode or the renewing mode of the apparatus.

Figure 7:
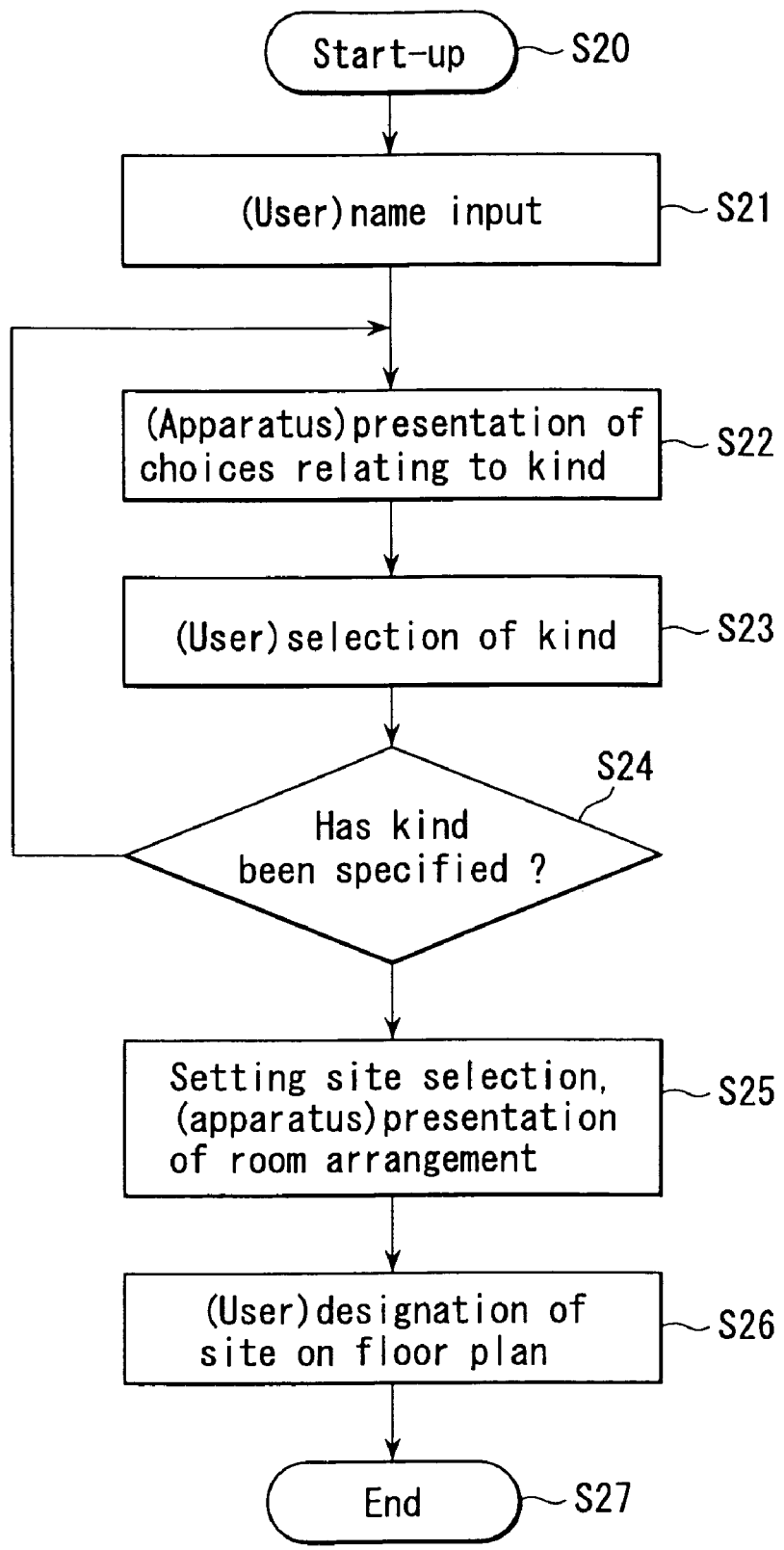
FIG. 7 is a flowchart showing the flow of the processing for registering the target-object to be monitored by the monitoring apparatus shown in FIG. 2.
Figure 8:
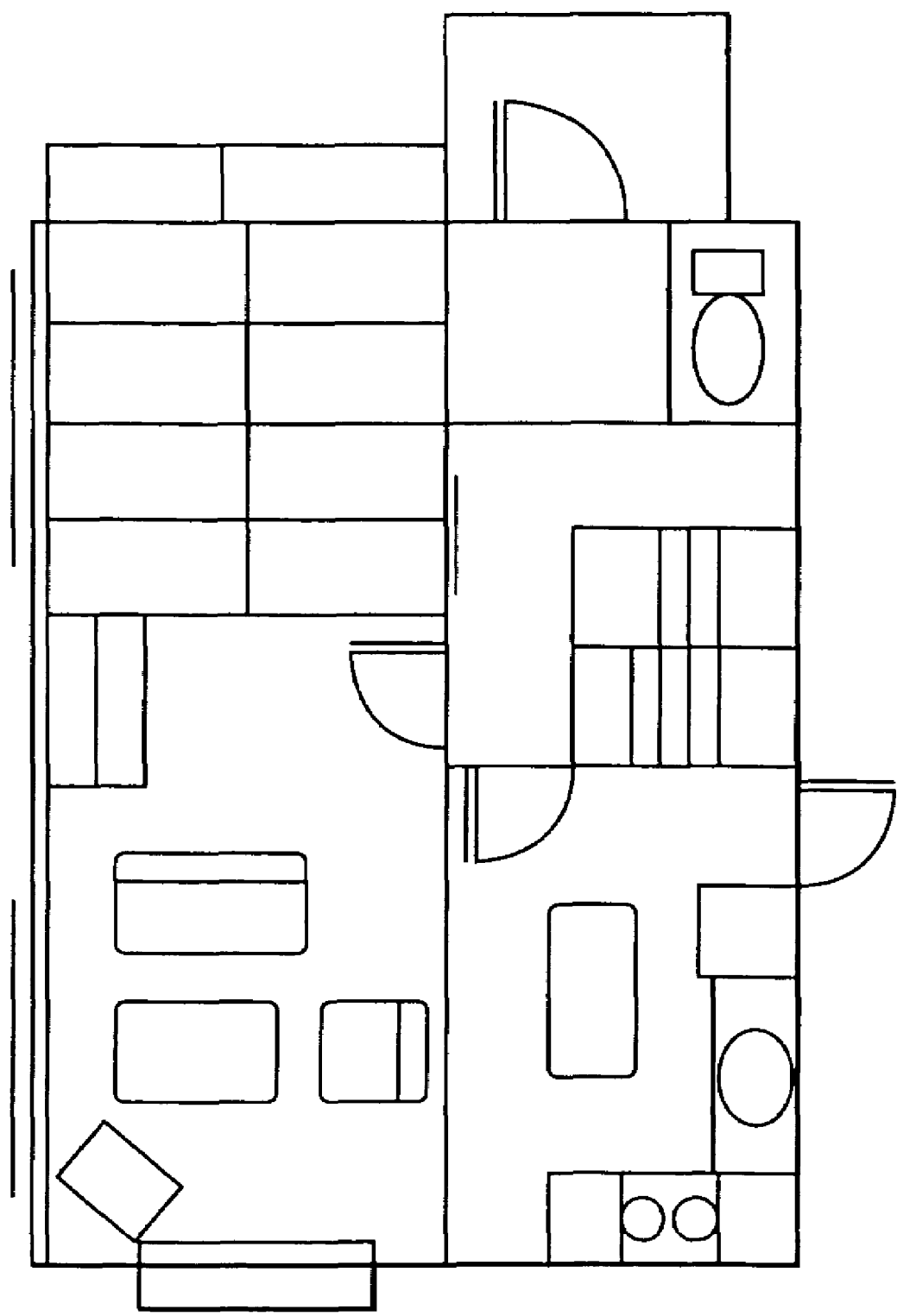
FIG. 8 is a plan view schematically showing an example of the floor plan housed in the individual guard-data storing unit of the monitoring apparatus shown in FIG. 2.

FIG. 7 is a flowchart showing the flow of the processing in the case of registering the target-object to be monitored in the monitoring apparatus. If the processing shown in FIG. 7 is started (step S20), the user inputs first the name of the target-object to be monitored by operating a keyboard, by the voice input or by the selection from a list (step S21). If the name of the target-object to be monitored is input, the language of the name is analyzed so as to search the kind (class) of the apparatus of the target-object to be monitored, and the choices are displayed (step S22). Then, the user selects the kind from the choices, and it is confirmed whether or not the kind has been specified (steps S23, S24). Where the kind is not specified, the operation is brought back again to step S22). Where the kind is specified in step S24, the room arrangement for selecting the installing site, e.g., the room arrangement as shown in FIG. 8, is displayed. If the position of the target-object to be monitored is specified on the room arrangement (step S26), the processing is finished (step S27).

The input from the choices can be achieved easily by allowing in advance the apparatus to display successively the updated information based on the information from the general monitor-knowledge storing unit 5 prepared locally or on the network in the form of choices which can be registered easily and by allowing the user to select the required information from the choices.

Also, if the target-object to be monitored has been specified, the information on the size of the target-object to be monitored and the driver, etc. required for the operation are searched on the inter-net by the server of each manufacturer and downloaded so as to be registered in the individual monitor-knowledge storing unit 4 and the general monitor-knowledge storing unit 5 of the monitoring apparatus. Then, if floor plan is already input into the individual monitor-knowledge storing unit 4, the information on the site is input into the position within the apparatus. If the floor plan is not input in the individual monitor-knowledge storing unit 4, the installing site is measured and registered by the input of the floor plan or by moving the monitoring apparatus to the position of the target-object to be monitored.

Given below are sequence examples ① to ⑭ in registering a small kitchen range in the kitchen.

① Screen display: "Please input the name."

If the sequence is started in step S20, a message "Please input the name." is displayed on the screen in step S21 so as to urge the user to input the name.

② Input by the user: "A small kitchen range in the kitchen"

The user inputs "a small kitchen range in the kitchen" in step S21.

③ Screen display: "Please input the kind . . . 'crime prevention', 'disaster prevention', 'watching', 'others'"

A message "Please input the kind." is displayed on the screen, and "crime prevention", "disaster prevention", "watching", and "others" are presented as choices (step S22).

④ Input by the user: "Selection of disaster prevention"

If the user selects "disaster prevention" in step S23, the operation is shifted to step S24. Since all the kinds are not specified, the operation is brought back to step S22.

⑤ Screen display: "Please input the kind . . . 'cooking', 'cleaning and washing', 'cooling or warming' . . . 'others'"

A message "Please input the kind." is displayed on the screen, and "cooking", "cleaning and washing", "cooling or warming" and "others" are presented as choices (step S22).

⑥ Input by the user: "Selection of cooking"

If the user selects "selection of cooking" in step S23, the operation is shifted to step S24. Since all the kinds are not specified, the operation is brought back to step S22.

⑦ Screen display: "Please input the kind . . . 'electrical cooking range', 'small cooking stove' 'electromagnetic cooking device' . . . 'others'"

A message "Please input the kind." is displayed on the screen, and "electronic cooking range", "small cooking stove", "electromagnetic cooking device" and "others" are presented as choices (step S22).

⑧ Input by the user: "Selection of small kitchen range"

If the user selects "a small kitchen range" in step S23, the operation is shifted to step S24. Since all the kinds are not specified, the operation is brought back to step S22.

⑨ Screen display: "Please input the name of the manufacturer . . . '### Inc.', '○△Inc.' . . . 'others'"

A message "Please input the name of the manufacturer." is displayed on the screen, and "### Inc.", "○△Inc." and "others" are presented as choices (step S22).

⑩ Input by the user: "Selection of "○△Inc.""

If the user selects "○△Inc." in step S23, the operation is shifted to step S24. Since all the kinds are not specified, the operation is brought back to step S22.

⑪ Screen display: "Please input the model number . . . 'AHA002', 'AVA234' . . . 'others'"

A message "Please input the model number." is displayed on the screen, and "AHA002", "AVA234" and "others" are presented as choices (step S22).

⑫ Input by the user: "Selection or input (voice or keyboard"

If the model number is selected, or if the model number is input by voice or a keyboard, the operation is shifted to step S24, and the operation is further shifted to step S25 on the grounds that all the kinds have been specified.

⑬ Screen display: "Presentation of 'Please input the site of installation . . . floor plan'"

A message "Please input the site of installation." is displayed on the screen and, at the same time, the floor plan as shown in FIG. 8 is presented.

⑭ Input by the user: "click on the floor plan"

If the user clicks the installing site in order to designate the site on the floor plan, the site is designated so as to finish the sequence (steps S25 and S26).

(Estimation of Information on the Kind and Site from the Name)

Figure 9:
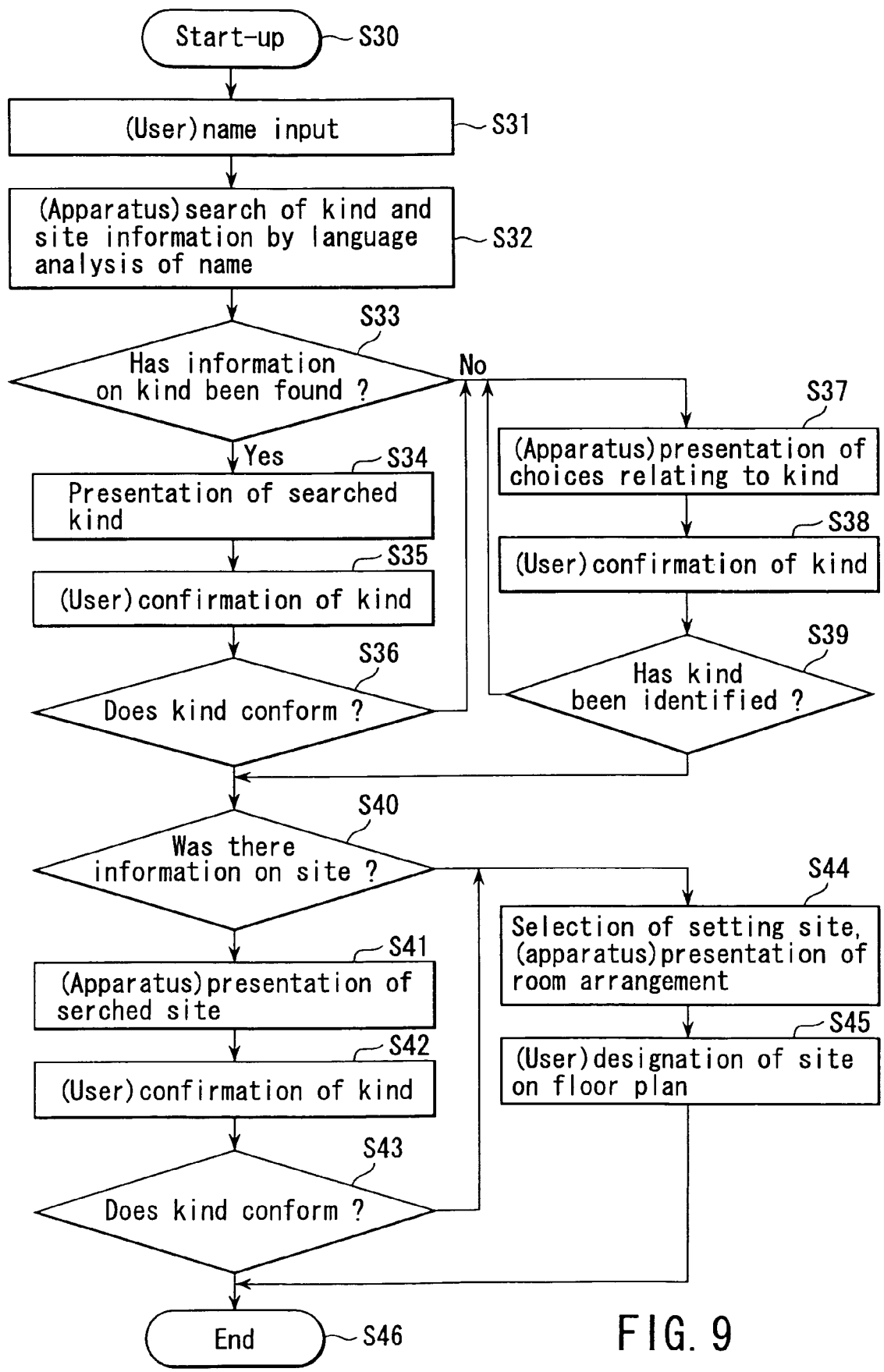
FIG. 9 is a flowchart showing the flow of another processing in the case of registering the target-object in the monitoring apparatus shown in FIG. 2.

FIG. 9 is a flowchart showing an example in which another user inputs the information on the target-object to be monitored in the individual monitor-knowledge storing unit 4 by using the monitor-knowledge registering unit 6. In this case, where "a small kitchen range in the kitchen" is input by the input using the name, the Japanese language is analyzed so as to distinguish the information between the information on the site and the information on the kind from the name. Also, in the next screen, the message is shifted from "a small kitchen range", which denotes the kind, to the selection of the name of the manufacturer. Further, the floor plan of the kitchen is displayed from the site "kitchen" in inputting the site so as to make it possible to decrease the input performed by the user.

The flow of the processing in registering the target-object to be monitored in the monitoring apparatus will now be described with reference to FIG. 9. If the processing shown in FIG. 9 is started (step S30), the user inputs first the name of the target-object to be monitored by means of a keyboard input, a voice input or by the selection from a list (step S31). If the name of the target-object to be monitored is input, the language of the name is analyzed so as to search the presence or absence of the choices relating to the kind (class) and the site of the apparatus of the target-object to be monitored (step S32). If the presence or absence of the information on the kind is recognized as a result of the search (step S33), the result of the search is presented in the case where there is information on the kind (step S34). The kind (class) is confirmed by the user, and it is judged whether or not the kind is satisfactory (steps S35 and S36). If the kind (class) fails to meet the requirement in step S36, the operation is shifted to step S37. Where the information on the kind is not found in step S33, the choices relating to the kind (class) are presented (step S37). The user selects the kind from the presented choices, and it is confirmed whether or not the kind is specified (steps S38 and S39). If the kind is not specified, the operation is brought back again to step S37. Where the kind fails to meet the requirement in step S36, or where the kind is not specified in step S39, it is confirmed whether or not there was information on the site (step S40). Where there is information on the site, the information on the searched site is presented, and the presented kind and site information are recognized by the user (steps S42 and S43). It is confirmed whether or not the site information meets the requirement. Where the site information meets the requirement, the processing is finished (steps S43 and S46). On the other hand, where the site information fails to meet the requirement, the room arrangement for selecting the installing site, e.g., the room arrangement as shown in FIG. 8, is presented. If the position of the target-object to be monitored is designated on the floor plan, the processing is finished (steps S44, S45, S46).

<Presentation of Candidates for the Target-object to be Monitored from the Input of Room Arrangement and Information on Room Arrangement>

A method using the floor plan as shown in FIG. 8 will now be described as an example of the method of inputting the site information in the individual monitor-knowledge storing unit.

Specifically, the user takes in the information on the room arrangement, i.e., a drawn floor plan or the design drawing obtained in the stage of the configuration, by using a camera of the monitoring apparatus. In this case, it is possible to obtain the floor plan opened on the web by the constructor from the general monitor-knowledge storing unit by taking in the information on the room arrangement by using, for example, another scanner or to input separately the floor plan noted above by using the monitor-knowledge registering unit 6. The monitor-knowledge registering unit cuts the floor plan taken into the individual monitor-knowledge storing unit into nodes having a hierarchy structure. For example, the inner region of a closed line is judged to be a room, and the user selects and determines the role of the room (kitchen, bathroom, etc.) from the choices rated in the order of the possibility in view of, for example, the size of the room and the presence or absence of the water supply. Then, the candidates of the target-object to be monitored (e.g., kitchen and gas cock→small cooking stove) are picked up as the lower stratum of the room nodes so as to be registered as the target-object to be monitored automatically or by the instruction of the user presented on the room arrangement.

(Example of Application to Crime Prevention)

Described in the following is an example of applying the monitoring apparatus of the present invention for preventing a crime in the general household.

In the monitoring apparatus that is intended to prevent a crime in the general household, the porch door and the kitchen door through which it is possible for an intruding thief to enter the house and the windows of various sizes arranged in each room are set as the target-objects to be monitored. In this case, a suspicious intruder from the outside is detected by the opening-closing sensor mounted to each door and each window or by an abnormality sensor such as a sound sensor mounted to a robot. It should be noted that the robot promptly goes to the site at which the abnormality has been detected so as to report the situation of the site to the user. Where a suspicious person has been found, the robot confirms the human being by the voice and the picture image, photographs the reflex of the suspicious person and reports the situation to where to contact.

As shown in FIG. 2, the monitoring apparatus of the present invention comprises two data base station unit including the data base in which the knowledge information (individual monitor-knowledge) on the individual target-object to be monitored is registered (individual monitor-knowledge storing unit 4) and the data base in which the general knowledge information (general monitor-knowledge) on the target-object to be monitored is registered (general monitor-knowledge storing unit 5). It should be noted that the monitor-plan executing unit 3 refers to the knowledge information described in these data bases so as to form appropriate the observing method for detecting an abnormality of the target-object to be monitored and the method of the countermeasure that should be taken when an abnormality has been detected. Therefore, when the user installs the monitoring apparatus of the present invention in the home of the user himself, it suffices to input the information inherent in the home of the user himself such as the installing position and type of the window and the door through the target-object knowledge registering unit 6 so as to register the input information in the individual monitor-knowledge storing unit 4 as the individual monitor-knowledge.

Described in the following are specific examples in respect of the registering operation of the target-object to be monitored in the monitoring apparatus, the information for the monitoring operation that is automatically formed by the monitoring apparatus in accordance with registration of the target-object to be monitored, and the monitoring operation performed by a movable guarding robot using the information noted above.

<Registration of Target-object>

When the monitoring apparatus of the present invention is installed in the home of the user, the information inherent in the home of the user himself among the information on the window and the door which are to be monitored is registered in the individual monitor-knowledge storing unit 4. The specific information to be registered is as follows.

① Name of the Target-object (Door and Window)

In principle, the names of all the doors and the windows to be monitored are registered by the user in the system in succession, which are provided within the home of the user himself, and is used for specifying each door and each window. Examples of the names include a porch door, a kitchen door, a south window in the living room, and an east window in the living room. In order to alleviate the burden of the user relating to the input operation, prepared is, for example, a method that the user selects the appropriate name from the list prepared by the system and showing typical names.

② Information on the Positions of the Target-objects (Door and Window)

For registering the information on the positions of the door and the window which are to be monitored, the room (region) in which the door and the window which are to be monitored are mounted is selected from the list (map) of the room arrangement of the home of the user himself, which is obtained and registered by another means, e.g., to receive the CAD data from the house manufacturer who constructed the home, and, then, the installing positions and the installing directions of the door and the window within the room (region) are input. Concerning the input method, prepared is a GUI input using the numeral input from a keyboard or a pointing device on a map. The information on the room arrangement is registered in the form of a hierarchy structure, and the standard coordinate system of each room (region) is relatively described on the standard coordinate system of the entire home. Also, the position and direction of each door and window within each room (region) are relatively described on the standard coordinate system of each room (region).

③ Information on the Types of the Target-objects to be Monitored (Door and Window)

For the registration of the information on the types of the door and window which are to be monitored, a list of the properties (specification) for each type of the door and window is presented on the basis of the general monitor-knowledge, and the registration is performed by selecting the types of the corresponding door and window from the list. The classes of the target-objects to be monitored (the door class and the window class or the sub-classes having a higher resolution) are determined by the information on the types.

<Information for Monitoring Operation Automatically Formed by the System in Accordance with Registration of Target-object to be Monitored>

If the names specifying the door and the window which are to be monitored, the position information and the type information are registered by the user, the information given below, which is required for the monitoring operation, is extracted from the general monitor-knowledge or is formed by the system as a key of these information items.

④ Information on the Setting of the Site of the Monitoring Operation

The information on the monitoring site (where to be moved and the direction) where an appropriate monitoring can be performed is calculated when a monitoring robot monitors the door and the window, which are to be monitored, on the basis of the combination of the information on the positions and types of the door and the window which are to be monitored and the information on the specification of the movable guarding robot. The information on these monitoring sites is described on the standard coordinate system of the target-object to be monitored.

⑤ Information on the Setting of Camera During Monitoring Operation

The information on, for example, the camera angle and the zoom value, which permits achieving an appropriate monitoring operation, is calculated when a monitoring robot monitors the door and the window, which are to be monitored, on the basis of the combination of the information on the positions and types of door and window which are to be monitored and the information on the specification of the movable guarding robot, as in the case of the information on the setting of the site of the monitoring operation.

⑥ Information on the Kind of Monitoring

By selecting the door and the window as the target-objects to be monitored, the system sets the kind of monitoring at the crime preventing option including opening-closing monitoring and breakage monitoring. Also, the information on the detecting unit and the countermeasure unit, which are used depending on the kind of the monitoring, is taken out of the general monitor-knowledge.

⑦ Information on Detecting Unit Used

The system selects the opening-closing sensors mounted to the door and the window, which are to be monitored, as the detecting unit for the opening-closing monitoring on the basis of the general monitor-knowledge. The selected opening-closing sensor of the door and the window has a simple configuration that the opening-closing of the door and the window is detected by using, for example, light and magnetic force. Selected as the detecting unit for the breakage monitoring are a vibration sensor mounted to the door and the window, which are to be monitored, and a sound sensor mounted to the movable guarding robot. Also used is a sensor for detecting whether or not the door knob operation of the doors partitioning the rooms has been performed in order to check the moving situation of the human being within the house. Further, selected is a judging process program for judging whether or not the window and the door, which were monitored, have been broken from the outputs of the vibration sensor and the sound sensor in conformity with the sensor used. The outputs of the sensors and the situations related to the incidences occurring at that time are accumulated in the judging process program so as to keep the judging process unit updated. Since many incidences in the past are accumulated in the judging process program, the erroneous detection is suppressed by the judging process program. Further, since the situation of the monitoring site is kept taken in as picture images by the camera mounted to the movable guarding robot, selected is a judging process program for judging, for example, the opening-closing state of the door and the window, the opening-closing state of the key, and the broken state of the window glass from the obtained picture images.

⑧ Information on Countermeasure Unit

The monitoring apparatus forms an abnormality recognizing unit and a unit for dealing with the abnormality on the basis of the general monitor-knowledge in preparation for the detection of an abnormality in the door and the window, which are to be monitored. For example, where breakage of the window has been detected, the monitoring apparatus forms the moving route of the movable guarding robot along which the movable guarding robot is promptly moved from the waiting position to the site of the monitoring operation for operating the camera mounted to the movable guarding robot so as to obtain the reflex for confirming the situation of the broken window and also forms the procedure of the operation. Also, where breakage of the window has been confirmed, the monitoring apparatus forms the procedure for reporting the situation in respect of the details of the abnormality to, for example, the user outside the house, the guarding company and the police station.

<Processing Between Introduction of Monitoring Apparatus and Finish of Monitoring Operation Performed by the Monitoring Apparatus>

Figure 10:
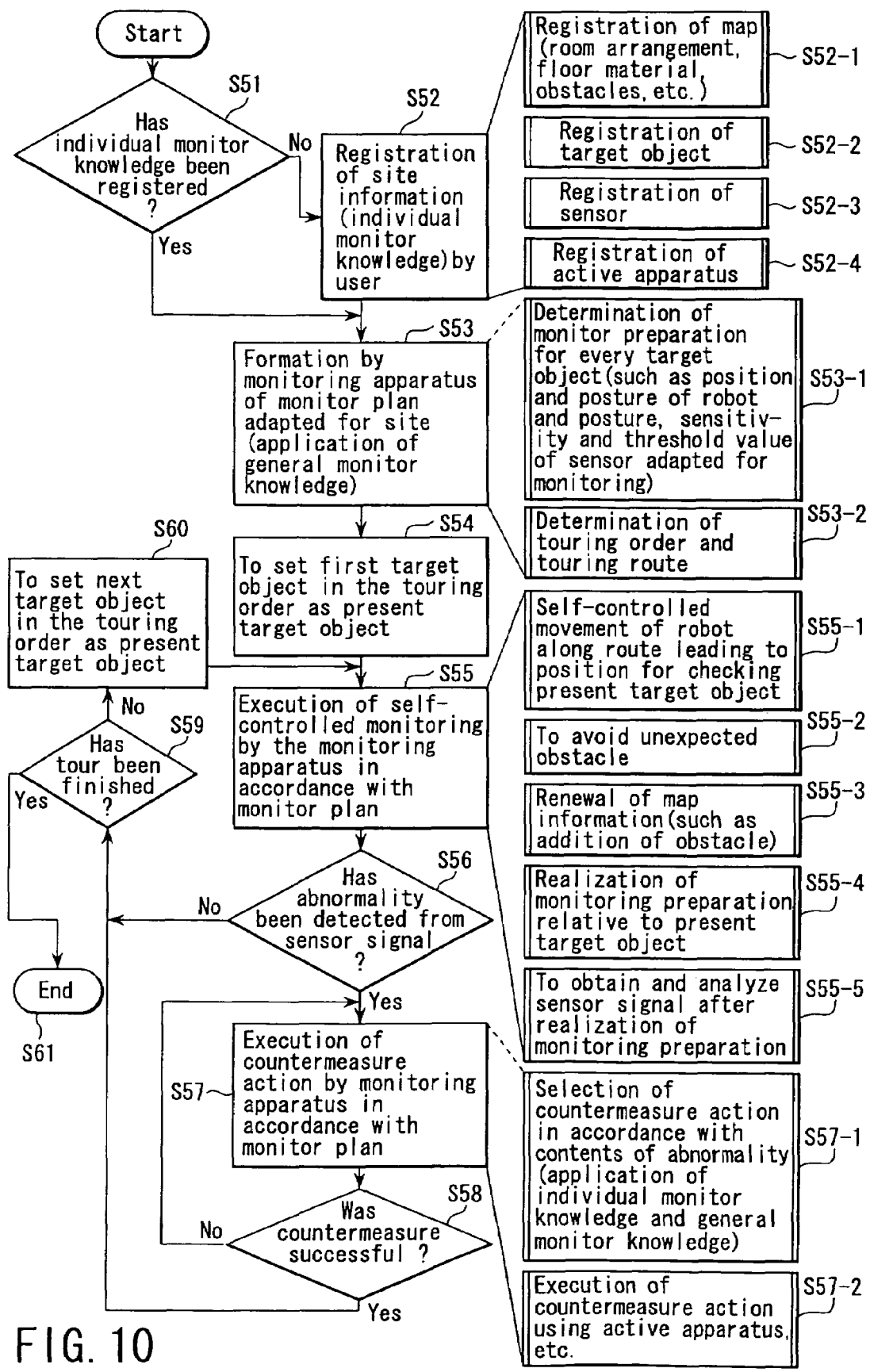
FIG. 10 is a flowchart for explaining the processing between the introduction of the monitoring apparatus and the finish of the guard operation of the monitoring apparatus in the monitoring apparatus shown in FIG. 2.

The processing between the introduction of the monitoring apparatus and the finish of the monitoring operation performed by the monitoring apparatus will now be described with reference to FIG. 10 in respect of the monitoring apparatus shown in FIGS. 2 and 3.

If the operation of the monitoring apparatus is started (step S50), it is confirmed first whether or not the individual monitor-knowledge is registered in the individual monitor-knowledge storing unit 4 (step S51). If the operation of the monitoring apparatus is started first after introduction of the monitoring apparatus, the site of the target-object to be guarded such as the home of the user is not known at all to the monitoring apparatus. Therefore, the individual monitor-knowledge inherent in the site is not registered in the individual monitor-knowledge storing unit 4. In this case, the operation is automatically shifted rightward from step S51 to step S52.

In step S52, the individual monitor-knowledge corresponding to the information on the site is registered by the user. As already described, at least the map of the site (including, for example, the room arrangement, the floor material and the obstacles), the target-objects to be monitored arranged in the site (the classes and the positions) and the initial position of the robot 11 must be registered as the individual monitor-knowledge (steps S52-1 and S52-2). The monitoring apparatus is put on the market under the state that the sensor and the active apparatus mounted to the movable guarding robot 11 have been registered in a part of the individual monitor-knowledge. Also, where the sensor and the active apparatus, which are sold as fittings of the monitoring apparatus, are mounted to the monitoring apparatus in the site, it suffices to register the site alone because these classes are already registered in a part of the individual monitor-knowledge. Where the sensor and the active apparatus, which are not attached to the robot body 11 and the monitoring apparatus, are added to the monitoring apparatus in the site, it is necessary to register the classes and the positions of these sensor and the active apparatus (steps S52-3 and S52-4). Incidentally, where the general monitor-knowledge corresponding to the classes of the sensor and the active apparatus which are to be added is not registered in the general monitor-knowledge, it is possible to install a part of the required general monitor-knowledge in the monitoring apparatus from the recording medium attached to the sensor and the active apparatus or on the on-line basis from the site of the supply sources of the sensor and the active apparatus. If such an individual monitor-knowledge is registered in the individual monitor-knowledge storing unit 4 even if only one time, a flag denoting the completion of the registration is recorded in the individual monitor-knowledge storing unit 4.

If the site information is registered in the individual monitor-knowledge storing unit 4 in the next step, the monitoring apparatus prepares a plan for the self-controlled monitoring of the site by using the registered individual monitor-knowledge and the registered general monitor-knowledge (step S53). In the first step, the monitoring apparatus determines the preparation of the robot 11 adapted for the checking of each of the target-objects to be monitored. The term "preparation" noted above represents, for example, the position and posture of the robot adapted for the robot to recognize an abnormality of the target-object to be monitored and the adjusting factors such as the sensor to be used and the setting of the sensitivity of the sensor. These information items can be calculated by calling the monitoring system determining method of the class of the target-object to be monitored, which is described in the general monitor-knowledge, in accordance with the class of the target-object to be monitored. The method permits determining, for example, the position on the floor plan to which the robot should go and the posture that should be taken by the robot as well as the selection, the sensitivity and the directivity of the sensor utilized in this case from the position of the monitoring apparatus on the floor plan and the list of sensors mounted to the monitoring apparatus. In general, the position of the robot 11 relative to the target-object to be monitored is given as a zone on the floor. The AND relationship between the zone thus given and the free space on the floor plan within which the robot can move is obtained, and the center of gravity of the region meeting the AND relationship is determined as the position to which the robot should reach. If the position is determined, the posture of the robot 11 is determined by the positional relationship between the position in question and the target-object to be monitored. At the same time, the details such as the kind, sensitivity and directivity of the sensor are determined in accordance with the distance relationship with the target-object to be monitored and the contents of the abnormality that should be clarified (step S53-1).

If the monitoring position of the robot 11 is determined for each of the target-objects to be monitored, calculated are the circulating order and the circulating route on the map, which permit the robot to circulate all the target-objects to be monitored in the shortest distance starting from the initial position of the robot (step S53-2).

If the circulating order and the circulating route are determined, the first target-object to be monitored in the circulating order is set at the present target-object to be monitored in step S54, and the self-controlled monitoring operation relating to the target-object to be monitored is started (step S55).

In step S55, the robot 11 is moved first in a self-controlled fashion to the monitoring position for confirming the abnormality in the present target-object to be monitored (step S55-1). The robot 11 is moved while avoiding the obstacles which are not shown in the map by fully utilizing the sensors such as a camera and an ultrasonic sensor mounted to the robot 11 so as to reach the monitoring position (step S55-2).

Also, the robot 11 is moved while adding to the map the portion differing from the map such as the obstacles which have been found every time the difference is found (step S55-3). In reaching the monitoring position, the robot 11 assumes a prescribed posture as the monitoring posture so as to set the required sensor (step S53-4) and to confirm an abnormality in the target-object to be monitored (step S55-5).

If an abnormality has been found in this step, the operation is branched downward from step S56 to reach step S57 such that the monitoring apparatus determines the required countermeasure action from the general monitor-knowledge (step S57-1) and executes the countermeasure action thus determined (step S57-2). The countermeasure action is executed by fully utilizing the active apparatus in addition to the transmission of information such as the report to the user. For example, the countermeasure is executed by means of the threatening of the intruder with a siren or a flash, the shut off of the gas by the operation of an electromagnetic valve, the start-up of the ventilating fan, and the recording with a camera reflex and a microphone sound.

Where the countermeasure action has been taken, the monitoring apparatus confirms the effect of the countermeasure action (step S58). The effect of the countermeasure action can be confirmed because the output of the sensor representing the abnormality is decreased or eliminated. In the case of, for example, the gas leakage, the shut off of the gas taken as the countermeasure action is regarded as being effective if the gas concentration has been found to be decreased. Also, where the gas concentration is lowered to a completely safe value, the monitoring operation is continued on the basis that the problem has been settled (steps S59 and S60). By contraries, if the gas concentration is not found to be decreased, the problem is serious because the gas leakage takes place in a position differing from the monitoring position. Where the emergency measure that can be taken by the monitoring apparatus fails to produce the effect, the monitoring apparatus reports the situation to the user and it is necessary for the user to take other countermeasures (leftward branch of step S58). For example, it is necessary for the user receiving the report from the monitoring apparatus to report the situation to the guarding company, the police station or the fire station.

The processing in the steps referred to above ranging between step S55 and step S60 relative to a single target-object to be monitored is repeated until the confirmation of all the target-objects to be monitored in a single tour is finished.

Incidentally, concerning the conditional branch of step S51, the operation is automatically branched rightward if a registration-finish flag denoting that the initial registration of the individual monitor-knowledge has been performed is not recorded in the individual monitor-knowledge storing unit. Also, where the registration-finish flag is recorded in the individual monitor-knowledge storing unit, the operation is branched rightward only when the user has given an instruction to the monitoring apparatus through the operational input device such as a switch of the monitoring apparatus to the effect that a new information is added to the individual monitor-knowledge after the registration or the individual monitor-knowledge after the registration is changed. Where the initial registration has already been performed and it is unnecessary to change the registered contents, the conditional branch is shifted to the downward branch so as to reach step S53 by skipping step S52. In this case, only the calculation of the circulating route is executed again (step S53-2) in step S53 in preparation for the case where new obstacles are detected in the past tour so as to renew the map information.

As described above, in the monitoring apparatus according to one embodiment of the present invention, the individual monitor-knowledge having a high individuality is housed in the individual monitor-knowledge storing unit 4 under the assistance by the general monitor-knowledge housed in the general monitor-knowledge storing unit 5 included in the monitoring apparatus of the present invention. Because of the particular configuration, if the user designates the target-object to be monitored, it is possible for the monitoring apparatus itself to determine automatically an appropriate monitoring method for monitoring the target-object on the basis of the designation. In addition, it is possible to automatically determine, for example, the monitoring preparation, the algorithm for the detection and processing of the abnormality and the contents of the countermeasure which should be taken in the event of an abnormality occurrence, which are included in the appropriate monitoring method. It is unnecessary for the user to set in detail by bothering the brain of the user himself the preparation on the side of the monitoring apparatus for monitoring the target-object such as the position and posture of the movable guarding robot, the posture of the monitoring camera, the state of the optical system such as the focus, iris and zoom, the sensitivities of the various sensors, the threshold value for judging the abnormality, and the effective countermeasure method. To be more specific, if the user including an amateur user designates the target-object to be monitored, it is possible for the monitoring apparatus itself to determine automatically an appropriate monitoring method for monitoring the target-object to be monitored including, for example, the algorithm for the monitoring system as well as for the detection and processing of the abnormality, and the specific countermeasure in an event of an abnormality occurrence.

Actual applications of the monitoring apparatus and modifications thereof will now be described.

Figure 11:
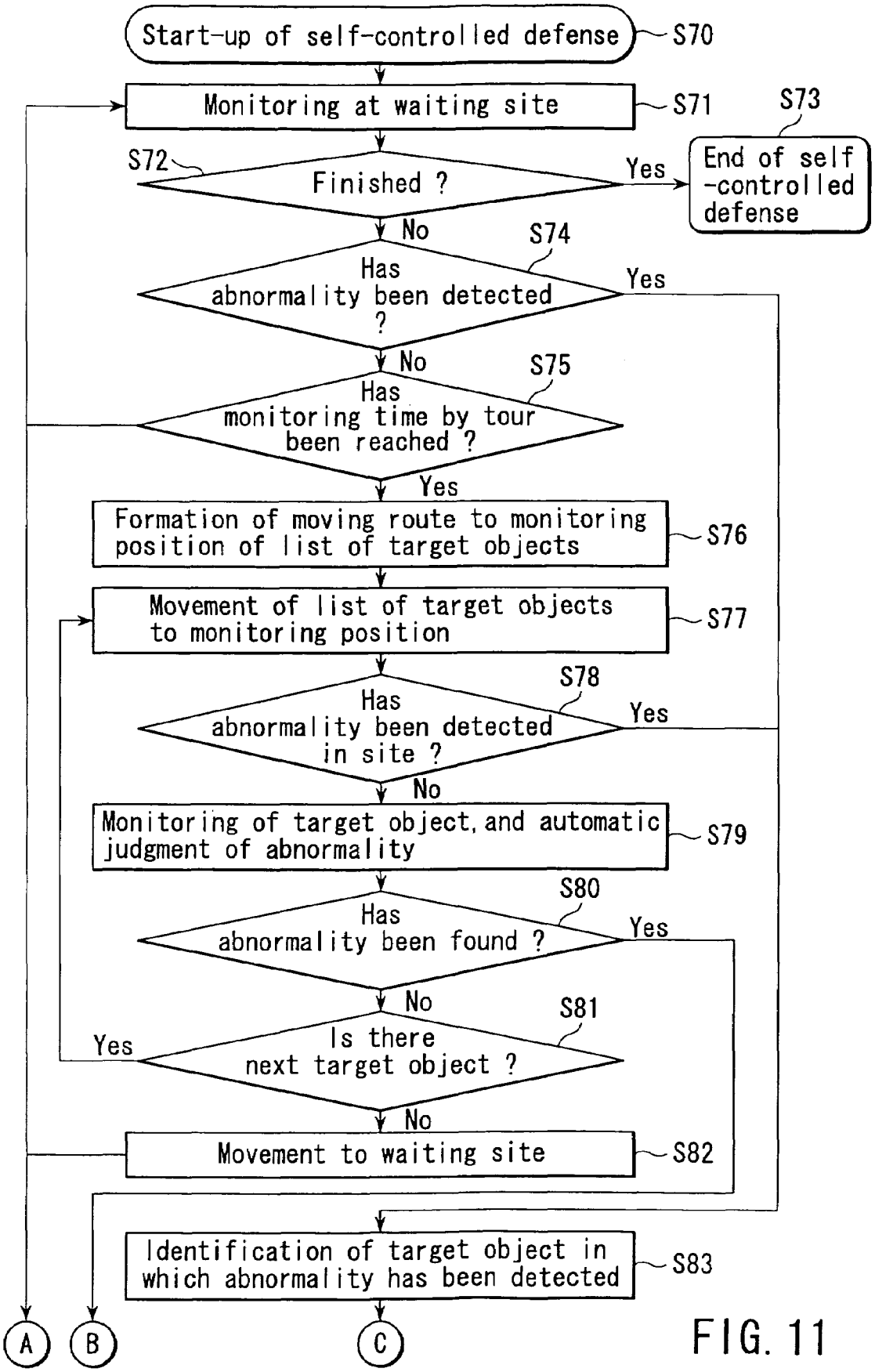
FIG. 11 is a flowchart showing the flow of the processing during the self-control alarming time in an example in which the monitoring apparatus shown in FIG. 2 is applied to the crime prevention.
Figure 12:
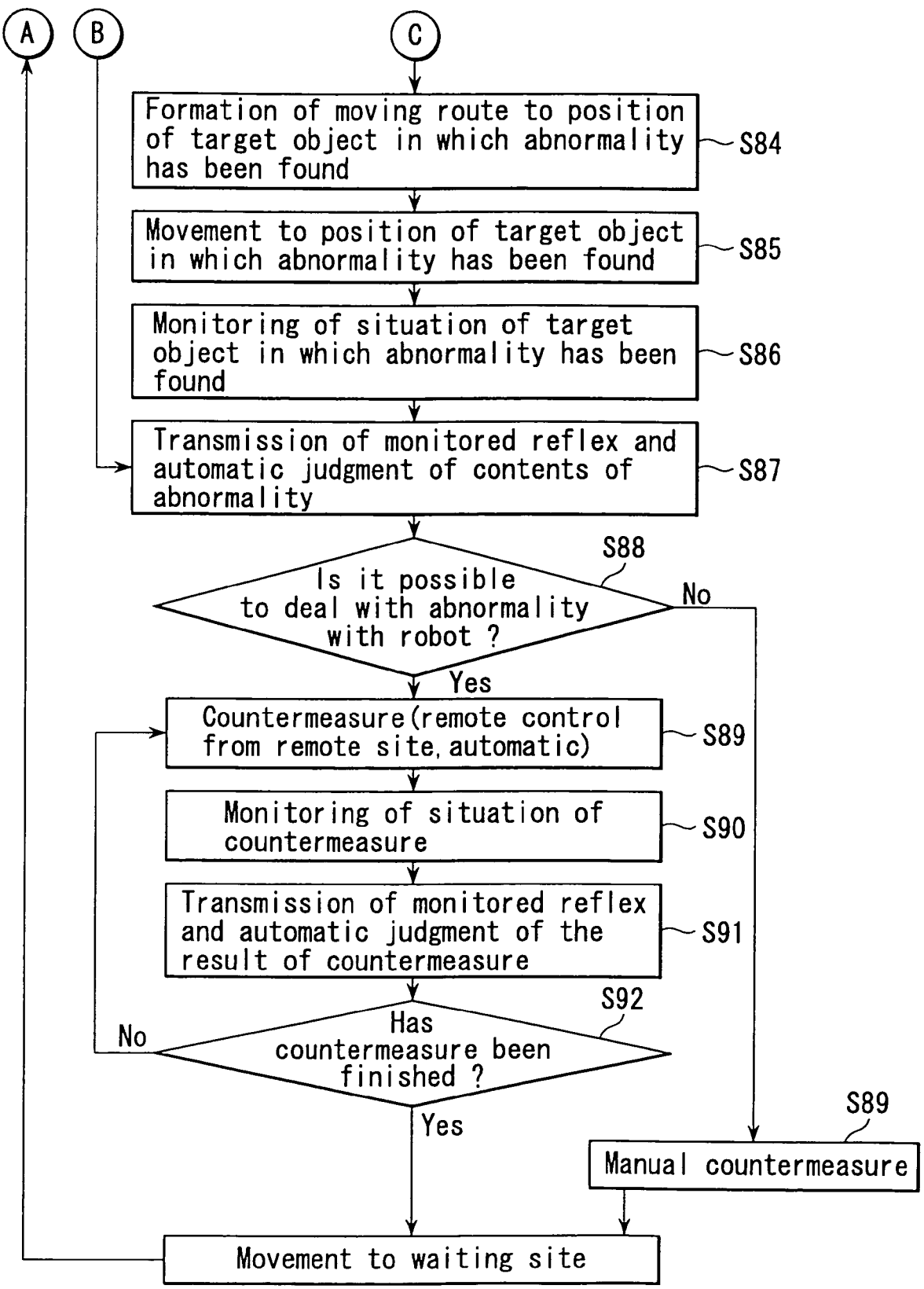
FIG. 12 is a flowchart showing the flow of the processing during the self-control alarming time in an example in which the monitoring apparatus shown in FIG. 2 is applied to the crime prevention.

<Specific Examples of Monitoring Operation Performed by Movable Guarding Robot>

Where the monitoring apparatus permits the movable guarding robot to perform the monitoring operation within the house of the user, there are two modes including a presence mode, which is the monitoring mode performed when the user stays in the house, and an absence mode, which is the monitoring mode performed when the user does not stay in the house. The monitoring operation is performed while automatically switching the monitoring modes depending on the situation. A specific example of the defense in which the monitoring operation is performed while automatically switching the monitoring modes depending on the situation, i.e., the processing of the self-controlled defense, will now be described with reference to FIGS. 11 and 12.

If the self-controlled defense is started (step S70), the movable guarding robot 11 starts its monitoring operation in a certain waiting site (step S71). Where it is confirmed whether or not the self-controlled defense is finished in step S72, the self-controlled defense is finished when it is confirmed that the self-controlled defense has been finished (step S73). Where the self-controlled defense has not been finished, it is confirmed in step S74 whether or not an abnormality has been detected in the observing unit 1. Where an abnormality has not been detected, it is confirmed whether or not the time for the movable guarding robot 11 to start its tour for the monitoring operation has been reached (step S75). Where the time to start the tour for the monitoring operation has not yet been reached, the operation is brought back again to step S71 and the monitoring operation in the waiting site is maintained. If the time to start the tour for the monitoring operation is reached in step S75, the moving route to reach the monitoring position listed as the target-object to be monitored is formed in the monitor-plan executing unit 3 on the basis of the individual monitor-knowledge and the general monitor-knowledge (step S76). Then, the movable guarding robot 11 starts its movement to the monitoring position listed as the target-object to be monitored along the moving route thus formed (step S77). Further, in step S78, it is confirmed whether or not an abnormality has been detected in the movable guarding robot 11 during its movement. Where an abnormality has not been detected, the target-object is monitored so as to automatically judge whether or not there is an abnormality in the target-object to be monitored (step S80). Then, it is confirmed in step S80 whether or not an abnormality has been found in the automatic judgment. If an abnormality is not found in this step, it is confirmed whether or not there is a next target-object to be monitored in the list (step S81). Where there is the next target-object to be monitored, the operation is brought back to step S76. On the other hand, where the next target-object to be monitored is not found, the movable guarding robot 11 is brought back to the waiting site (step S82) so as to continue again the monitoring operation in the waiting site as shown in step S71.

If an abnormality is detected in steps S74 and S78, the target object in which the abnormality has been detected is specified (step S83). In order to move the guarding robot 11 to the monitoring position for monitoring the target-object, formed is a moving route leading to the monitoring position (step S84). The movable guarding robot 11 begins to move to the monitoring position along the moving route (step S85). If the guarding robot 11 reaches the monitoring position, the target-object is monitored (step S86) and the details of the abnormality occurring in the target-object to be monitored are automatically judged (step S87). Incidentally, where an abnormality is found in the automatic judgment in step S80, the details of the abnormality in the target-object are automatically judged.

Where a fixed sensor has detected an abnormality in specifying the target-object in which the abnormality has been detected, the monitor-plan executing unit 3 obtains the map information included in the individual monitor-knowledge, and the site at which the abnormality has been generated is specified on the basis of the map information. Also, where the sensor mounted to the guarding robot 11 has detected an abnormality, the monitor-plan executing unit 3 obtains the related information from the sensor signal, and the site at which the abnormality has been generated is specified on the basis of the map information. For example, where a stereo microphone has detected a sound generated when a glass is cracked, the source of the sound is specified so as to determine the direction of the window glass, and position of the window glass is specified from the map information. Where the door and the window through which it is possible for a suspicious person to intrude into the house from the outside constitute the target-objects to be monitored, utilized as the observing apparatus is an opening-closing sensor for detecting an abnormality in the door and the window constituting the target-objects to be monitored, a vibration sensor, a sound sensor mounted to the guarding robot 11 or a TV camera. Also, where a room door for detecting a suspicious person intruding into the house and hanging about within the room constitutes the target-object to be monitored, the presence of the intruder is detected by the output of the opening-closing sensor, which is an observing apparatus mounted to the room door when the family is absent.

When the guarding robot is moved to the site of the abnormality generation, the monitor-plan executing unit 3 specifies the present position of the guarding robot 11 and permits the guarding robot to be moved to the site of the abnormality generation while avoiding the obstacle by utilizing various sensors, running over the obstacle by utilizing the countermeasure mechanism of the guarding robot 11 itself, or passing through, for example, the door.

If the contents of the abnormality are judged, it is judged whether or not it is possible for the guarding robot 11 to deal with the contents of the abnormality (step S88). The judgment is executed by the monitor-plan executing unit 3. For example, it is assumed as an example of the measure for dealing with the abnormality that a door knob operating apparatus constituting a countermeasure unit is mounted to the room door that is monitored in addition to the observing unit of the opening-closing sensor, and the door knob is automatically operated upon receipt of a remote control signal emitted from the movable guarding robot constituting the other countermeasure unit so as to confine the intruder within the room. Also, when the observing unit has found a suspicious person hanging about within the room, it is possible for the countermeasure unit of the movable guarding robot to be moved to the site and to talk to the suspicious person so as to obtain the voice of the response and the reflex, thereby identifying the suspicious person. In this case, the identified suspicious person is reported to where to contact.

If it is impossible for the guarding robot 11 to deal with the contents of the abnormality, a manual countermeasure is determined (step S89) and the contents of the abnormality are reported. If the manual countermeasure is determined, the movable guarding robot 11 is brought back to the waiting position (step S90). Where the movable guarding robot 11 is capable of dealing with the contents of the abnormality in step S88, a countermeasure that can be taken by the guarding robot 11 is automatically applied. Alternatively, another countermeasure unit is imparted to the guarding robot 11 by a manual remote control operation so as to deal with the contents of the abnormality (step S89). The situation of dealing with the abnormality is monitored (step S90). Also, the reflex is recorded and the monitored reflex is transmitted. Further, the result of the countermeasure is judged in the monitor-plan executing unit 3 (step S91). In step S92, it is confirmed whether or not application of the countermeasure has been finished. Where application of the countermeasure has not yet been finished, the operation is brought back to step S89. On the other, where the application of the countermeasure has been finished, the movable guarding robot 11 is brought back to the waiting site (step 90) so as to continue again the monitoring in the waiting site as in step S71.

In the self-controlled defense described above, the items given below are judged in accordance with each mode, and various kinds of processing are carried out.

In the presence mode, which is the monitoring mode at the time when the user stays in the house, the movable guarding robot 11 periodically makes a tour for monitoring the monitoring sites within the house, particularly, the room in which the family does not stay. When the sensor has detected an abnormality, the abnormality is reported to the family by, for example, an alarm sound, and the movable guarding robot 11 makes an emergency movement to the site at which the abnormality has been detected.

Also, in the absence mode, which is the monitoring mode at the time when the family is not in the house, the movable guarding robot 11 periodically makes a tour for monitoring the monitoring sites within the entire house, particularly, the sites into which it is possible for a suspicious person to intrude. When the sensor has detected an abnormality, the movable guarding robot 11 makes an emergency movement to the site at which the abnormality has been detected so as to confirm the situation of the site, to obtain a reflex, and to report the situation to the family outside the house.

The switching between the presence mode and the absence mode is automatically judged and performed by the movable guarding robot 11, if the user talks to the movable guarding robot 11 when he goes out of doors and when he comes back home. For example, every time the door knob operation sensor detects that the family goes to the porch during the presence mode, the movable guarding robot 11 goes to the porch for seeing the family off. If the user talks to the movable guarding robot 11, saying "I'm going now.", the movable guarding robot 11 performs the human being identification by the voice recognition and the face image processing so as to confirm who of the family goes out. When all the family members registered in advance in the movable guarding robot 11 have been judged to be in the state of going out, it is detected that the porch door is closed and locked. At the same time, the monitoring mode of the movable guarding robot 11 is switched from the presence mode to the absence mode. On the other hand, if some of the family comes homes and enters the house by unlocking the porch, the movable guarding robot 11 also comes out to greet the family at the porch. If the user talks to the movable guarding robot 11, saying "I'm coming now.", the robot 11 performs the human being identification by the voice recognition and the face image processing as at the time of going out so as to confirm who of the family has come home and to switch the monitoring mode to the presence mode. If the robot 11 has judged that a person other than the family registered in the robot 11 has entered the house, the measure against a suspicious person described herein later is executed. Incidentally, the switching of the monitoring mode can be utilized as a material for judging the reasonableness of the switching by allowing the robot 11 to learn the daily schedules of all the family members. To be more specific, it is possible to perform an automatic switching between the monitoring in the presence mode and the monitoring in the absence mode by allowing the monitor-plan executing unit 3 to learn the daily schedules of all the family members. Also, it is desirable for the reasonableness of the switching to be judged in the monitor-plan executing unit 3 so as to prevent the switching of the monitoring mode based on the erroneous judgment.

Where the door knob operation sensor has performed its operation when the monitoring mode is set at the absence mode, it is judged that it is possible for a suspicious person to be hanging about within the house and, thus, the movable guarding robot 11 promptly goes to the site for confirmation of the situation. Incidentally, the door knob operation sensor also performs the function of the door knob operating apparatus. When the movable guarding robot 11 periodically makes a tour for the monitoring operation, it is possible for the robot 11 to perform the door knob operation for allowing the robot 11 to pass through the door section by transmitting a remote control signal from the robot 11.

Concerning the countermeasure that is taken by the movable guarding robot 11 when an abnormality has been detected during the absence mode, the robot 11 is promptly moved by the self-controlled movement to the site at which the abnormality has been detected so as to photograph the entire reflex and the zoom up reflex for confirming the situation of the site. The automatic judgment in respect of the contents of the abnormality such as the breakage of the window glass and the opening-closing situation of the window is attempted by the movable guarding robot 11 on the basis of the obtained reflexes. At the same time, the result of the automatic judgment and the reflexes of the site are transmitted to the user outside the house. The user outside the house judges the situation based on the reflexes of the site so as to operate the robot 11 by means of the remote control operation or to report the situation to the guarding company and the police station, as required. Also, where a suspicious person hanging about within the house has been detected, it is possible for the movable guarding robot 11 to talk to the suspicious person with a synthetic voice so as to perform the identification of the human being and to photograph the reflex of the suspicious person, the photo thus obtained being transmitted to the user outside the house. It is also possible for the user outside the house to talk to the suspicious person via the robot 11.

Figure 13:
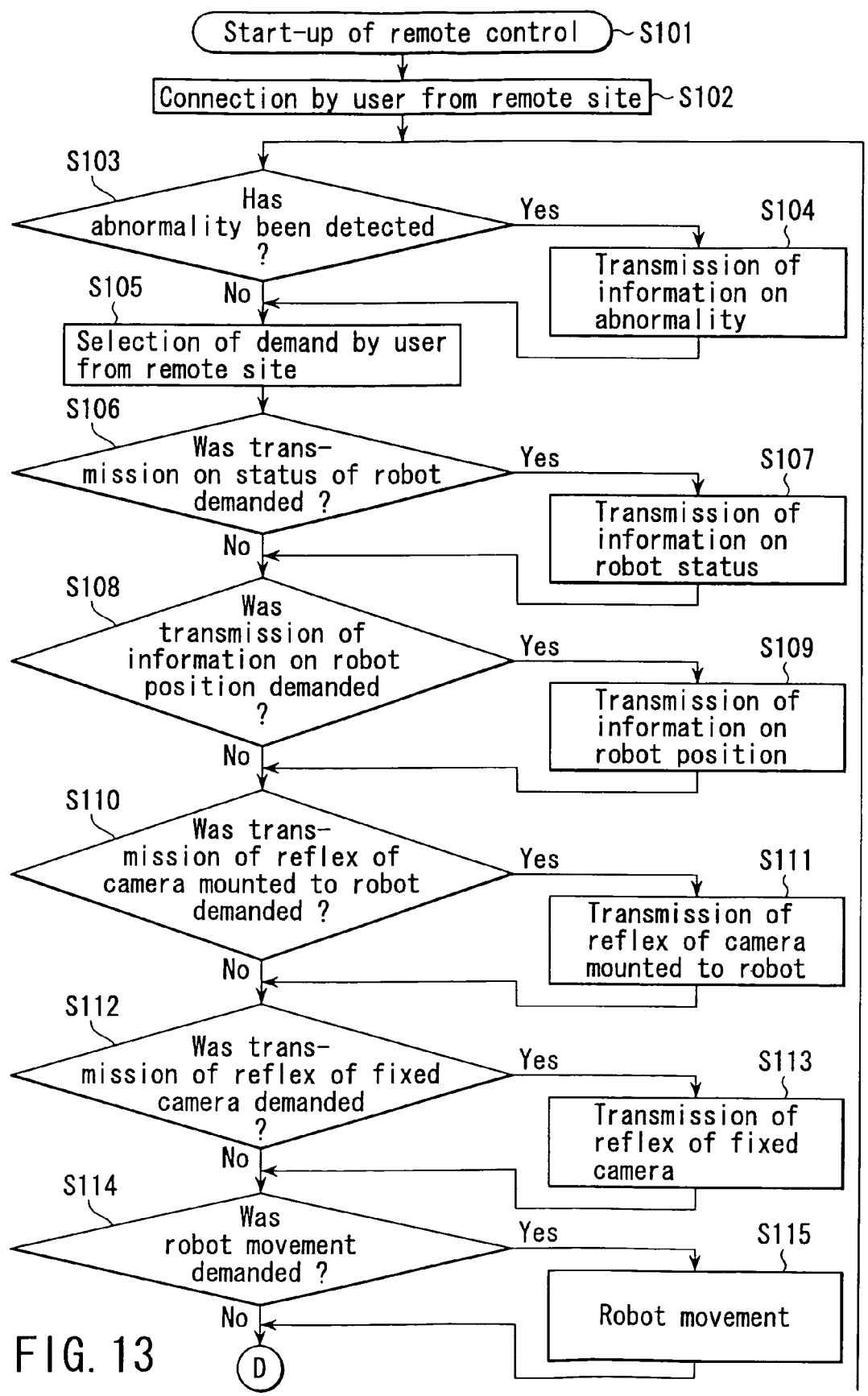
FIG. 13 is a flowchart showing the flow of the processing during the remote control time in an example in which the monitoring apparatus shown in FIG. 2 is applied to the crime prevention.
Figure 14:
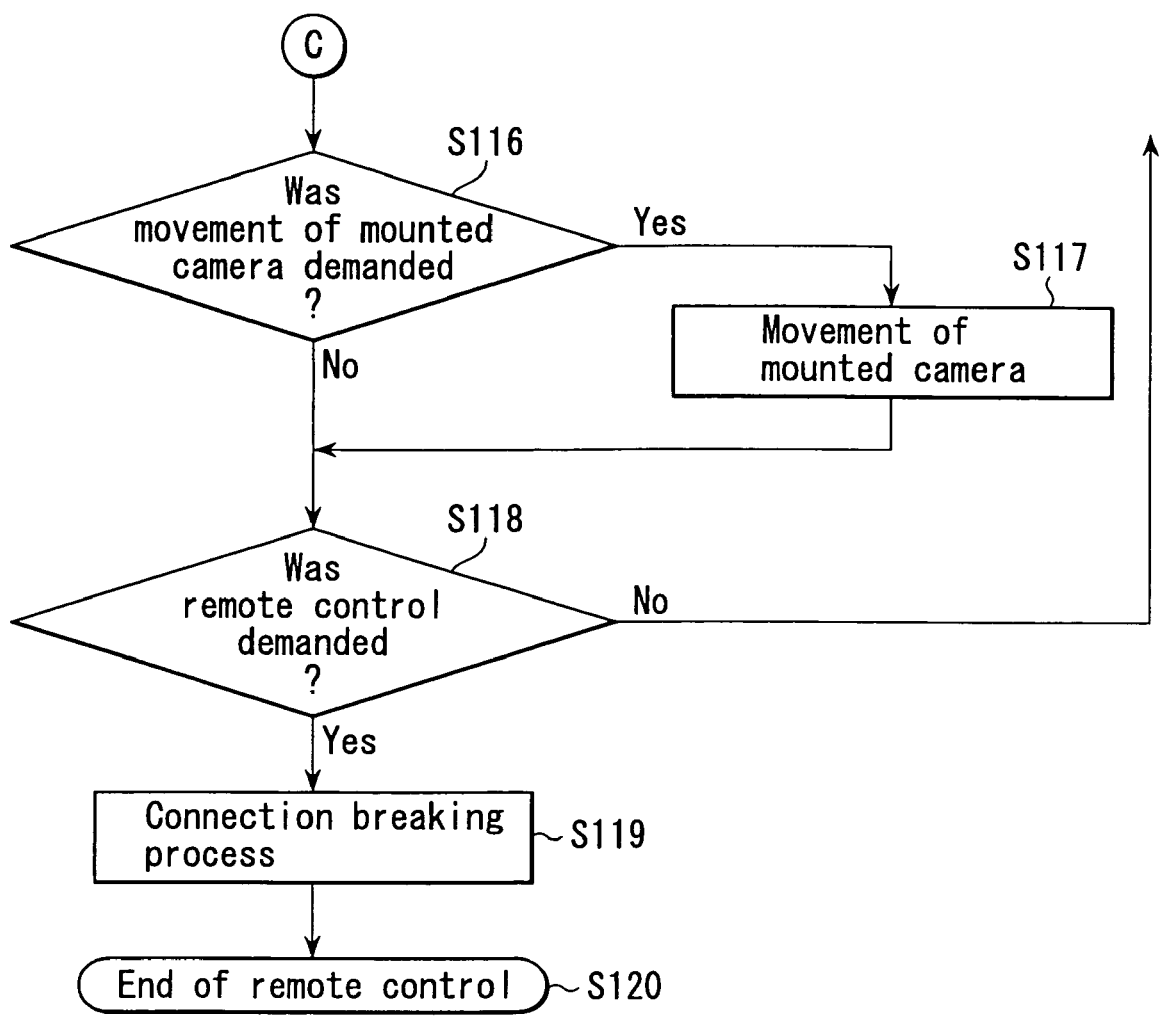
FIG. 14 is a flowchart showing the flow of the processing during the remote control time in an example in which the monitoring apparatus shown in FIG. 2 is applied to the crime prevention.

The processing for the remote control of the monitoring apparatus will now be described with reference to FIGS. 13 and 14.

If the remote control is started in step S101, the connection between the user in a remote location and the monitoring apparatus is established (step S102). Under this state, it is confirmed whether or not an abnormality has been detected (step S103). Where an abnormality has been detected in step S103, the information on the abnormality is transmitted to the user (step S104). On the other hand, where an abnormality has not been detected in step S103, the user selects from the remote location a certain demand from a list of prescribed demands via a communication system (step S105). It is confirmed whether or not the demand selected by the user is a demand for transmitting the status of the movable guarding robot 11 (step S106). If it is confirmed in step S106 that the transmitting demand has been selected by the user, the status information on the guarding robot 11 is transmitted to the user in step S107. After steps S106 and S107, it is confirmed in step S108 whether or not the demand for transmitting the reflex data photographed by the camera mounted to the guarding robot 11 is included in the demands selected by the user (step S110). If it is confirmed in step S110 that the demand for transmitting the reflected data is included in the demands selected by the user, the reflex data photographed by the camera mounted to the guarding robot 11 is transmitted to the user (step S111). Then, it is confirmed in step S112 whether or not the demand for transmitting the reflex data from a camera fixed within the room monitored by the guarding robot 11 is included in the demands selected by the user. Where the demand for transmitting the reflex data from the fixed camera is included in the demands selected by the user, the reflex date photographed by the fixed camera is transmitted to the user (step S113). Also, it is confirmed whether or not the demand for moving the guarding robot 11 is included in the demands selected by the user (step S114). If the demand for moving the guarding robot 11 is included in the demands selected by the user, the guarding robot 11 is moved.

In moving the guarding robot 11, the instruction given below is given to the guarding robot 11 in the monitor-plan executing unit 3. If a menu of the target-objects to be monitored (window A or small kitchen range B) is prepared as an individual supervising knowledge, the menu is given to the user. In accordance with the selection by the user on the menu, the monitor-plan executing unit 3 gives an instruction to the movable guarding robot 11 to move, for example, the window A or the small kitchen range B to the monitoring position. Where a menu relating to the destination of the movement (kitchen or living room) is prepared as individual supervising knowledge, the monitor-plan executing unit 3 gives an instruction relating to the destination of the movement to the guarding robot 11. On the other hand, where a map is prepared as individual supervising knowledge, the monitor-plan executing unit 3 gives an instruction for the user to move the guarding robot 11 to the designated location. Alternatively, where the user has set the moving amount (e.g., moving forward by 1 m, swinging rightward by 90°) of the guarding robot 11, the monitor-plan executing unit 3 gives an instruction to move the guarding robot 11 by the moving amount thus set.

If the steps 116 and 117 are finished, it is confirmed whether or not the remote control has been finished. Where the remote control has not yet been finished, the operation is brought back to step S105, and all the demands selected by the user are checked.

On the other hand, where the remote control has been finished, the operation for cutting the connection between the user and the monitoring apparatus is executed in step S119. Then, the processing for the remote control is finished in step S120.

(Examples of Application to Disaster Prevention)

Described in the following is an example of using the monitoring apparatus for this embodiment for dealing with a fire in the general household.

Figure 15:
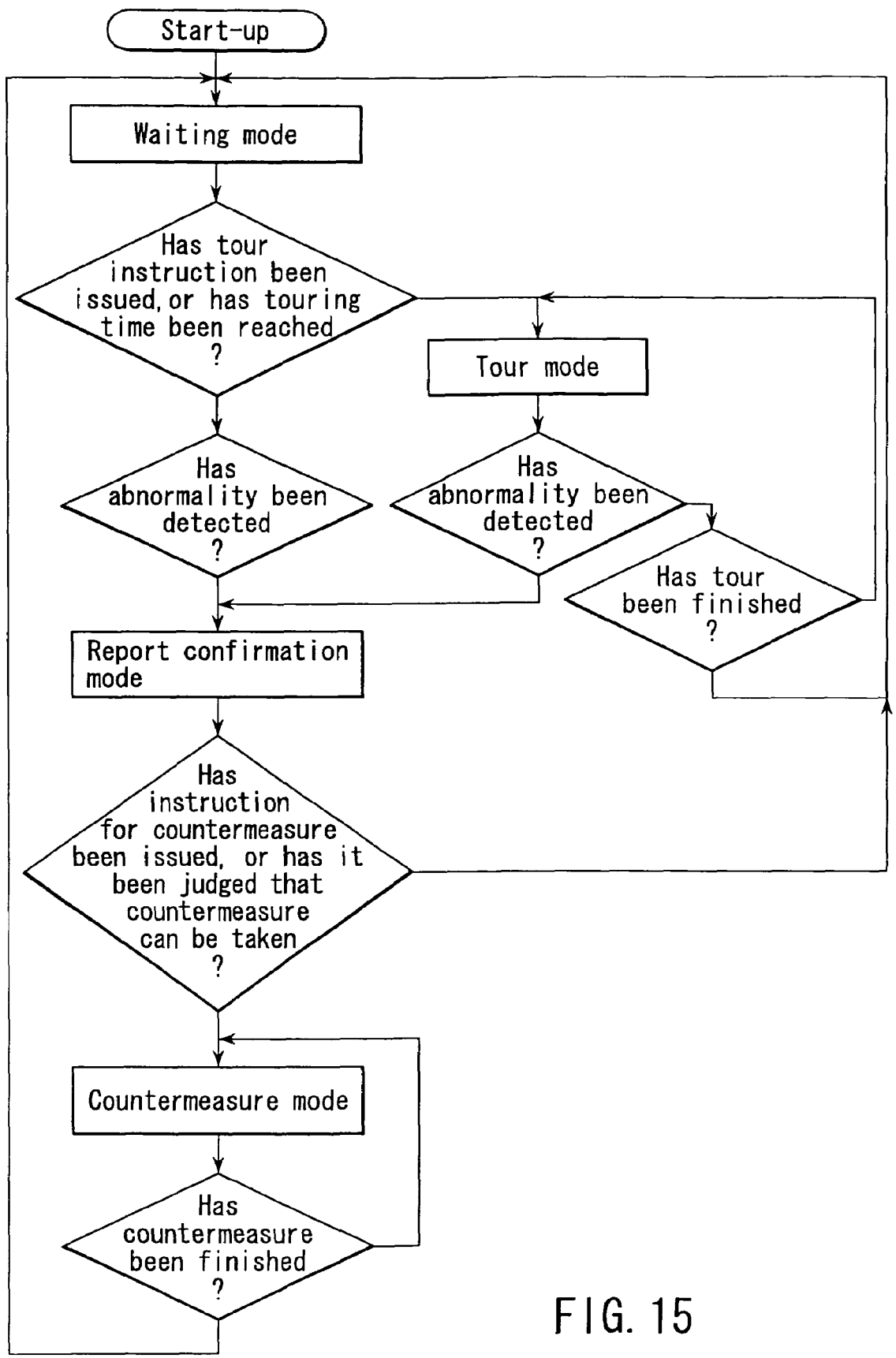
FIG. 15 is a flowchart showing the flow of the processing in an example in which the monitoring apparatus shown in FIG. 2 is applied to the crime prevention.

FIG. 15 shows the processing in the case where the monitoring apparatus of the present invention is applied to the disaster prevention. Also, FIG. 16 exemplifies the configuration of the monitoring apparatus used for the disaster prevention.

Figure 16:
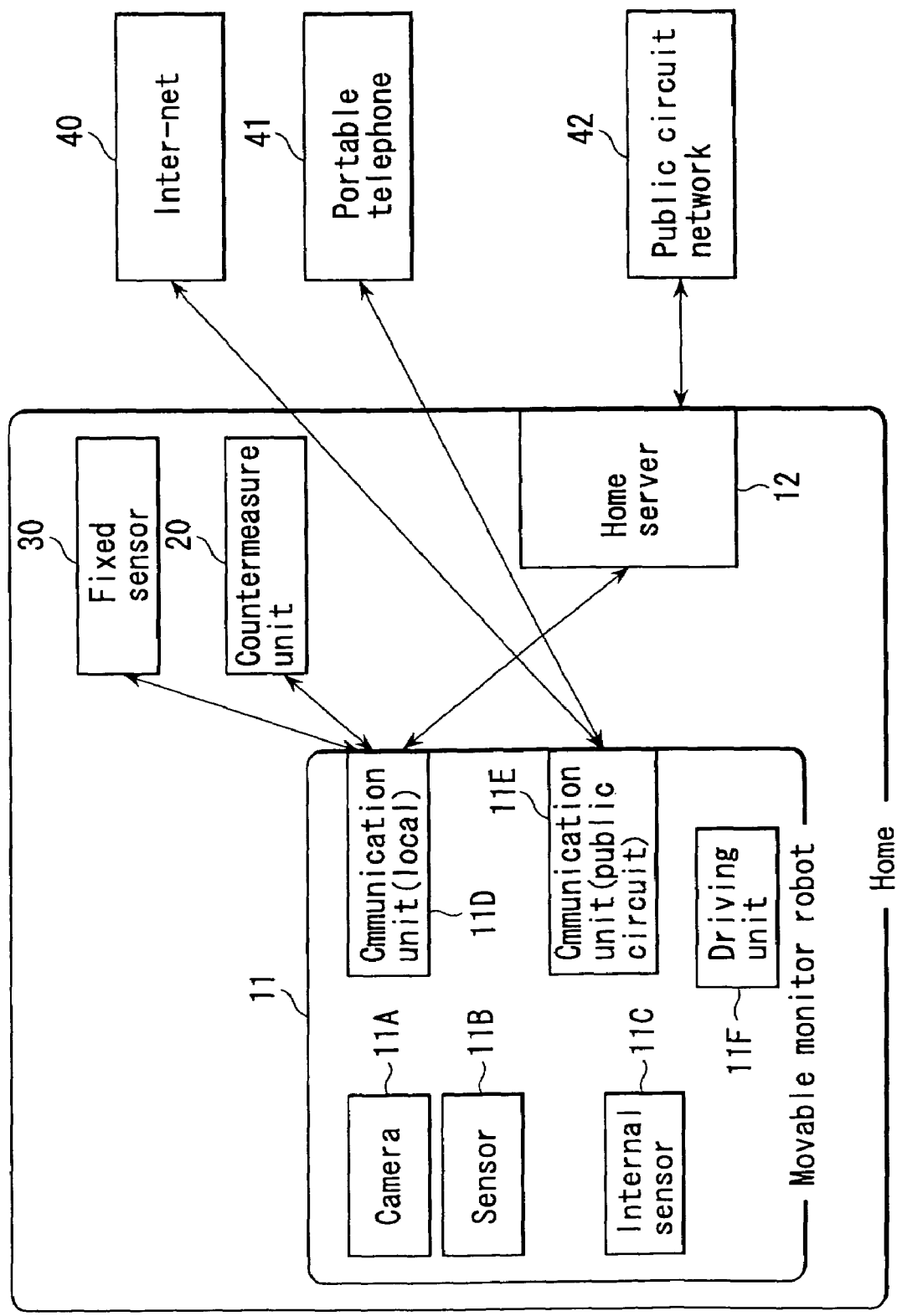
FIG. 16 is a block diagram showing as an example the configuration of the apparatus, covering the case where the monitoring apparatus shown in FIG. 2 is applied to the crime prevention.

As shown in FIG. 16, the monitoring apparatus comprises a movable guarding robot 11 and a home server corresponding to a sensor 30, a countermeasure unit 20 and a base station unit 12, which are mounted within a house. The movable guarding robot 11 is provided with a monitor camera 11A for photographing the target-object to be monitored within the house by the movable guarding robot 11, a sensor 11B for detecting an abnormality relating to the target-object other than the movable guarding robot 11, an internal sensor 11C for detecting the state of the movable guarding robot 11, and a driving unit 11F for moving the movable guarding robot 11. The movable guarding robot 11 is also provided with a communicating unit 11D for the data transmission to and from the home server 12. It should be noted that the communicating unit 11D constitutes a local area network between the movable guarding robot 11 and the home server 12. Also, the movable guarding robot 11 is provided with a communicating unit 11E for connection to, for example, an inter-net 40 and is connected to the public network via the communicating unit 11E. Further, the home server 12 is connected to a general public network 42. It should be noted that the monitoring apparatus is constructed such that the user is capable of access to the home server 12 and the movable guarding robot 11 through the inter-net 40 and the public network 42.

In the monitoring apparatus shown in FIG. 16, which is used for the disaster prevention, prepared are a registration mode, a wait and tour mode, a communication and confirmation mode, and a countermeasure mode as the operation modes. If the monitoring is started (step S120) in the monitoring apparatus of the particular configuration, the movable guarding robot 11 is retained first in the waiting mode (step s131). Then, it is confirmed in step S132 whether or not an instruction to make a tour has been given from the user, or whether or not the time to start the tour has been reached. Where the touring instruction has not been given, or the time to start the tour has not yet been reached, the movable guarding robot 11 is retained in the state of detecting an abnormality in the waiting site. If an abnormality has not been detected in the waiting site in step S133, the operation is brought back again to step S131. Also, if an abnormality has been detected in step S133, the operation is shifted to the report and confirmation mode in step S137.

If an instruction to make a tour is given, or if the time to start the tour is reached in step S132, the operation is set at the touring mode in step S134. Then, the movable guarding robot 11 starts its tour in the touring mode, and it is judged whether or not an abnormality has been detected during the tour (step S135). If an abnormality has not been detected, it is confirmed whether or not the tour has been finished in step S136. Where the tour has not yet been finished, the operation is brought back to step S134. On the other hand, if the tour has been finished, the operation is brought back to the waiting mode in step S131. If an abnormality has been detected in step S135, the operation is shifted to the report and confirmation mode in step S137.

In the report and confirmation mode in step S137, an abnormality is reported to the home server 12 through the communicating unit 11D or both the communicating unit 11D and the inter-net 40, and the home server 12 gives an instruction to the movable guarding robot 11 to confirm the abnormality. The abnormality is also reported to a portable telephone 41 of the user through the communicating unit 11E, and the user contacts the home server 12 through the public network 42 in accordance with the abnormality so as to give a required instruction to the home server 12. In accordance with the instruction, the home server 12 instructs the movable guarding robot 11 or another countermeasure unit to take an appropriate countermeasure.

After the report and confirmation mode in step S137, it is confirmed whether or not an instruction for the countermeasure has been given from the user or the home server 12, or whether or not it has been judged that it is possible to take a suitable countermeasure (step S138). The operation is brought back to the waiting mode in step S131 in the case where an instruction has not been given because a measure need not be taken against the abnormality, or where it is judged that the monitoring apparatus is incapable of dealing with the abnormality and, thus, the user has reported the situation to the guard (including a policeman or a fireman) to that effect.

Where an instruction on the countermeasure has been given from the user or the homer server 12, or where it is judged that the countermeasure unit 20 included in the monitoring apparatus is capable of dealing the abnormality in step S138, a countermeasure mode is set and executed in step S139. Then, it is confirmed in step S140 whether or not the executed countermeasure has been finished. Where it has been confirmed that the executed countermeasure has not yet been finished, the operation is brought back to step S139. On the other hand, where the executed countermeasure has been finished, the operation is brought back to the waiting mode in step S131.

<Registration Mode in the Use for Disaster Prevention>

The user registers the information on the target-objects to be monitored in the individual monitor-knowledge storing unit 4 by using the monitor-knowledge registering unit 6, as already described. There are various target-objects to be monitored in respect of the disaster prevention including, for example, the objects which possibly cause a fire such as a small kitchen range, a stove, a smoothing iron and the surroundings of an electrical outlet; a hot water supply system using a gas, a gas cooking stove and a gas stove, which possibly cause a gas poisoning by, for example, a carbon monoxide gas generated by a gas leakage and the incomplete combustion; and a bath and a washing machine, which possibly cause a water leakage.

In the case of registering the small kitchen range as the target-object to be monitored, registered is the information on the name, kind, type number, installing site, and other features of the small kitchen range. The method of registering the installing site includes the method of inputting the installing site on the floor plan and the input method in which the movable guarding robot is operated from a predetermined reference position (for example, the charging station) so as to move the movable guarding robot to the installing site and allow it to face in the camera direction. In this case, the movable guarding robot recognizes the position of the robot itself by using a sensor mounted to the robot itself and is positioned to face in the direction of the camera so as to estimate the position of the small kitchen range and to record the installing position of the small kitchen range in the map owned by the robot itself. Concerning the registration of the kind of the small kitchen range and the additional information, the item of "small kitchen range" is selected from the general monitor-knowledge storing unit owned in advance by the movable guarding robot or from the general monitor-knowledge storing unit on the Internet 40, and the general information on the small kitchen range (observing method: a camera, a heat sensor, a smoke sensor; countermeasure method: extinction) is registered in the individual monitor-knowledge storing unit 4 as the information on the target-object to be monitored. In this fashion, the target-object which the user wishes to be monitored is registered.

<Wait and Tour Mode>

After completion of the registration, the movable guarding robot is disposed at a prescribed position such as a charging station. The movable guarding robot forms a touring route on the basis of the registered information on the target-object to be monitored, the internal information on the robot such as remaining amount of the battery, the instruction from the user, the sensor information owned by the robot itself, and the information given from the sensor installed within the house in view of the sites to be monitored, the frequency of the monitoring, and the monitoring time so as to prepare an action plan of the movable guarding robot.

The actions of the movable guarding robot include a wait mode, in which the movable guarding robot, which is not moved, monitors the states of the various sensors and cameras owned by the robot itself and the state of the stationary sensor installed within the house, and a tour mode, in which the movable guarding robot makes a tour for monitoring the states of the various sensors and cameras owned by the robot itself and the state of the stationary sensor installed within the house.

The movable guarding robot performs its action based on the action plan thus prepared. In the wait and tour mode, the movable guarding robot judges the kind and occurring site of the abnormality from the wireless communication or the alarming sound generated from the sensor arranged in advance when the various kinds of sensors mounted to the robot detect an abnormality such as the elevation of the ambient temperature detected by a temperature sensor, a smoke detected by a smoke sensor and a gas detected by a gas sensor, or when the sensors arranged in advance within the house such as a temperature sensor, a smoke sensor or a gas leakage sensor detects an abnormality. When an abnormality has been detected, the operation is shifted to the report and confirmation mode.

<Report and Confirmation Mode>

The countermeasure is changed depending on the kind of the detected abnormality in accordance with the countermeasure table stored in the general monitor-knowledge storing unit 5 or the individual monitor-knowledge storing unit 4. In the case of the detection by a sensor having, for example, a high emergency, the reporting process is performed promptly. Concerning the reporting process, the situation is reported to the user, the defense company and the fire station directly from the movable guarding robot or through the server arranged separately. When it comes to a sensor having a low emergency or a sensor generating an erroneous report in many cases, the reporting process is not performed promptly and a confirming process is performed first. In the confirming process, the robot itself is moved to the site of the abnormality occurrence or turns the camera to face in the site of the abnormality occurrence in accordance with the instruction from the user or the instruction from the defense company so as to obtain the reflex and sound representing the contents of the abnormality. Then, the movable guarding robot judges the contents of the abnormality from the obtained reflex and sound. Alternatively, the obtained reflex and sound are transmitted to the user or the defense company so as to permit the user or the defense company to judge the contents of the abnormality occurrence. In accordance with the result of the judgment, the operation is shifted to the reporting process or the countermeasure mode.

<Countermeasure Mode>

Where it has been found from the clarified contents of the abnormality that it is possible for the movable guarding robot to deal with the abnormality, the abnormality is dealt with by the movable guarding robot itself or by operating the apparatus within the house. For example, the spraying of agent for extinguishing a fire toward a high temperature portion in the case of detecting a fire can be performed by the movable guarding robot itself. On the other hand, the abnormality that can be dealt with by operating the apparatus within the house covers, for example, the case where a gas cock breaker is operated when a gas leakage has been detected, and the case where a ventilating fan is turned when a smoke has been detected.

(Examples of Application for Watching)

Described in the following are examples of using the monitoring apparatus of the present invention for the watching of an aged person and an infant in the general household.

(Class of Target-object to be Watched)

The target-objects to be watched include a diseased person having the health impaired, an aged person deteriorated in the recognizing capacity, judging capacity and the capacity for locomotion, and an infant who is required to be kept watched. In this example of the application, the target-objects to be watched are classified into 6 classes given below so as to execute the required watching.

(1) Diseased person: A Family Member Requiring the Watching Because of the Disease The diseased person stays in many cases at a prescribed site such as a bed room. However, since the diseased person freely moves within the house, it is necessary to know the site at which the diseased person stays. Therefore, required are the image processing and the voice processing for distinguishing and tracing the diseased person himself or herself. Alternatively, it is necessary for the diseased person to carry a wireless tag.

(2) Aged Person Confined to His Bed: A Aged Person Disabled and Confined to his Bed Because of His Advanced Age Since the aged person stays in a prescribed site such as a bed in a bed room, it is unnecessary to distinguish and trace the aged person.

(3) Aged Person with Dementia: A Aged Person Disordered in the Memory Function and the Judging Function Because of His Advanced Age The aged person stays in many cases at a prescribed site such as a living room. However, since the aged person freely moves within the house, it is necessary to know the site at which the aged person stays. Therefore, required are the image processing and the voice processing for distinguishing and tracing the aged person himself or herself. Alternatively, it is necessary for the aged person to carry a wireless tag.

(4) Aged Person with Dementia, Who is Confined to His Bed: a Aged Person Disabled, Confined to His Bed, and Disordered in the Memory Function and the Judging Function Since the aged person stays in a prescribed site such as a bed in a bed room, it is unnecessary to distinguish and trace the aged person.

(5) Infant: An Infant who can Move Freely but is not Provided with a Sufficient Judging Function and Physical Power An infant stays in many cases at a prescribed site such as a children's room. However, since the infant freely moves within the house, it is necessary to know the site at which the infant stays. Therefore, required are the image processing and the voice processing for distinguishing and tracing the infant himself or herself. Alternatively, it is necessary for the infant to carry a wireless tag.

(6) Young Baby: A Young Baby who Cannot Move by Himself or Herself

Since a young baby stays at a prescribed site such as a baby bed, it is unnecessary to distinguish and trace the young baby.

(Monitoring Task and Sub-task)

The monitoring task that must be performed by the monitoring apparatus includes a task for grasping the site at which the target-object to be monitored stays and an abnormality detecting task described below and is further divided into several sub-tasks.

Site Grasping Task:

The site grasping task is a task applied to the class of the target-object that can move freely. This task is performed by the grasping of the movement of the human being by the heat source reaction and by the door opening-closing sensor and by the subsequent identification of the individual person by means of the voice identification and the face image identification or by the grasping of the site by the carried wireless tag.

Abnormality Detection Task:

The abnormality detection task is a task for monitoring whether or not the target-object to be monitored is rendered dangerous. This task includes sub-tasks for the activity detection, for the dangerous action detection and for the detection of the symptom of the danger given below.

Activity Detection:

The activity detection, which is a sub-task applied to every class, is performed by the recognition of the respiration and the movement of the body performed by the image processing and by the recognition of voice performed by the voice identification.

Dangerous Action Detection:

In the dangerous action detection, which is a sub-task applied exclusively to an aged person with dementia and to an infant, recognized is a dangerous action such as the approach to a high temperature portion, the movement to a height, and the hang-over from the window of the second floor or higher.

Detection of Symptom of Danger:

In the detection of the symptom of the danger, which is a sub-class applied to every class, recognized is some danger by detecting a shriek, a groan, and a cry exclusively by a voice identifying processing.

(Countermeasure)

Where the abnormality detecting task has detected some abnormality such as an inactivity, a dangerous action or a symptom of danger, the monitoring apparatus talks to the target-object to be monitored so as to sound out the response or recommends the target-object to stop the dangerous action. Where the situation is not improved even a prescribed time later, or where a disaster or an intruder has been clearly recognized, a stronger countermeasure is taken such as the generation of an alarming sound, the reporting of the situation to the user outside the house, or the recording of the situation.

(Other Assistance)

It is advisable for the monitoring apparatus to provide a topic of the day taken from the inter-net to, particularly, the aged person for the chattering with the aged person in addition to the watching service. Alternatively, it is advisable for the monitoring apparatus to assist the aged person to facilitate the use of various electrical appliances and the information apparatuses within the house.

(Modified Embodiments)

The monitoring apparatus of the present invention is not limited to the embodiment described above. It is possible to modify the monitoring apparatus of the present invention in various fashions without departing from the technical idea of the present invention.

For example, it is possible to realize the individual monitor-knowledge storing unit 4 and the individual monitor-knowledge storing unit 5 in the form of a recording medium detachable from the apparatus body.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A monitoring apparatus for monitoring an abnormality of target-objects and executing a countermeasure for preventing an incident in accordance with an abnormal situation of the target-object, comprising:

first storing unit configured to store general monitor knowledge and information on a general feature of the target-objects, a general observing method of the target-objects and a general executing method relating to the target-objects;

input unit configured to input individual monitor knowledge and information on the respective target-objects with utilizing the general monitor knowledge and information;

second storing unit configured to store the individual monitor knowledge and information;

planning unit configured to plan observing and countermeasure programs relating to the abnormal situation of the target-object based on the general and individual monitor-knowledge and information;

observing unit configured to observe the target-object in accordance with an observing program to generate a situation information; and executing unit configured to execute a countermeasure program in accordance with the situation information from the observing unit.

2. The monitoring apparatus according to claim 1, wherein the monitoring apparatus corresponds to a household guard apparatus for detecting an abnormality and executing a countermeasure for preventing a crime in the general household.

3. The monitoring apparatus according to claim 2, wherein the target-object is a door or a window, and the observing apparatus detects an abnormality of the door or the window.

4. The monitoring apparatus according to claim 2, wherein the target-object is a room door, the observing unit includes an opening-closing sensor mounted to the room door.

5. The monitoring apparatus according to claim 2, wherein the input unit includes an input device that permits the user to input the information on the location of the target-object to be monitored by designating a coordinate on a display screen.

6. The monitoring apparatus according to claim 2, wherein the individual monitor information includes information denoting a kind of the target-object and input unit includes a displaying unit configured to displaying kinds of the target-object for selecting one of the kinds.

7. The monitoring apparatus according to claim 1, wherein the individual monitor-knowledge and information includes a name of the target-object, which permits individually identifying the target-object and the type of the target-object, which permits identifying the kind of the target-object to be monitored.

8. The monitoring apparatus according to claim 1, wherein the planning unit includes a third storing unit configured to store situation data of time information and the situation information from the observing unit, the situation and time information relating to past incidences produced in the target-object at respective times, wherein the planning unit judges the abnormal situation of the target-object from the situation data.

9. The monitoring apparatus according to claim 1, wherein the situation information on the target-objects includes:

change of locations of the target-objects.

10. The monitoring apparatus according to claim 1, wherein the general monitor knowledge and information includes information on locations of the observing unit.

11. The monitoring apparatus according to claim 1, wherein the observing unit includes a camera monitoring the target-objects.

12. The monitoring apparatus according to claim 1, wherein the observing unit is mounted on a movable guarding robot, configured to communicate via a wireless link to a base station and configured to be charged by a charging unit.

13. The monitoring apparatus according to claim 1, wherein the target-objects include doors and windows.

14. A method of monitoring an abnormality of target-objects and executing a countermeasure for preventing a crime in accordance with an abnormal situation of the target-objects, comprising:

storing general monitor knowledge and information on a general feature of the target-objects, a general observing method of the target-objects and a general executing method relating to the target-objects;

inputting individual monitor knowledge and information on the respective target-objects with utilizing the general monitor knowledge and information;

storing the individual monitor knowledge and information;

planning observing and countermeasure programs relating to the abnormal situation of the target-object based on the general and individual monitor-knowledge and information;

observing the target-object in accordance with an observing program to generate a situation information; and executing a countermeasure program in accordance with the situation information from the observing the target-object.

15. The monitoring method according to claim 14, wherein the individual monitor-knowledge and information includes a name of the target-object, which permits individually identifying the target-object and the type of the target-object, which permits identifying the kind of the target-object to be monitored.

16. The monitoring method according to claim 14, wherein the planning includes storing situation data of time information and the situation information from the observing unit, the situation and time information relating to past incidences produced in the target-object at respective times, wherein the abnormal situation of the target-object is judged from the situation data.

17. The monitoring method according to claim 14, wherein the monitoring method corresponds to a household guard method of detecting an abnormality and executing a countermeasure for preventing a crime in the general household.

18. The monitoring method according to claim 14, wherein the target-object is a door or a window, and the observing includes detecting an abnormality of the door or the window.

19. The monitoring method according to claim 14, wherein the target-object is a room door, the observing includes sensing an opening and closing of the room door.

20. The monitoring method according to claim 14, wherein the inputting includes permitting the user to input the information on the location of the target-object to be monitored by designating a coordinate on a display screen.

21. The monitoring method according to claim 14, wherein the individual monitor information includes information denoting a kind of the target-object and input unit includes a displaying unit configured to displaying kinds of the target-object for selecting one of the kinds.

22. The method of monitoring an abnormality of target-objects according to claim 14, wherein the situation information on the target-objects includes:

change of locations of the target-objects.

23. The method of monitoring an abnormality of target-objects according to claim 14, wherein the general monitor knowledge and information includes information on locations from where the observing is performed.

24. The method of monitoring an abnormality of target-objects according to claim 14, wherein the observing is performed with a camera monitoring the target-objects.

25. The method of monitoring an abnormality of target-objects according to claim 14, wherein the observing is performed from a movable guarding robot, configured to communicate via a wireless link to a base station and configured to be charged by a charging unit.

26. The method of monitoring an abnormality of target-objects according to claim 14, wherein the target-objects include doors and windows.

* * * * *